(12) United States Patent
Yamauchi et al.

(10) Patent No.: US 6,842,560 B2
(45) Date of Patent: Jan. 11, 2005

(54) OPTICAL MULTIPLEXING CIRCUIT AND OPTICAL MULTIPLEXER

(75) Inventors: Yoshiki Yamauchi, Hiratsuka (JP); Kouichi Fujisaki, Yokosuka (JP); Akimasa Kaneko, Mito (JP); Takashi Asaoka, Tokyo (JP); Yoshihisa Sakai, Isehara (JP)

(73) Assignees: NTT Electronics Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 178 days.

(21) Appl. No.: 10/082,923

(22) Filed: Feb. 26, 2002

(65) Prior Publication Data

US 2002/0126341 A1 Sep. 12, 2002

(30) Foreign Application Priority Data

Feb. 27, 2001 (JP) ..................................... 2001-053053

(51) Int. Cl.[7] ............................................... G02B 6/28
(52) U.S. Cl. ........................................... 385/24; 385/31
(58) Field of Search .............................. 385/15, 24, 31, 385/46, 49.5, 129; 398/13, 16, 30, 33

(56) References Cited

U.S. PATENT DOCUMENTS

| 5,617,234 A | * | 4/1997 | Koga et al. .................... 398/14 |
| 5,706,377 A | | 1/1998 | Li |
| 5,809,184 A | | 9/1998 | Doerr et al. |
| 6,301,031 B2 | * | 10/2001 | Li ................................ 398/9 |

FOREIGN PATENT DOCUMENTS

| EP | 0 591 042 A1 | 4/1994 |
| JP | 02244105 A | 9/1990 |
| JP | 05313029 A | 11/1993 |
| JP | 06232843 A | 8/1994 |
| JP | 10224829 | 8/1998 |
| JP | 2000065686 A | 3/2000 |
| JP | 2000078085 A | 3/2000 |
| JP | 2002-148459 | 5/2002 |

OTHER PUBLICATIONS

Zhong, Shan, Lee, Chau–Han, Lin, Xiao, Yang, Xiao–Hui, Chen, Yung–Jui and Stone, Dennis, Integrated real time multi–channel wavelength monitoring circuit using phased–array waveguide grating, IFC.IOOC '99, Optical Fiber Communication Conference/International Conference on Integrated Optics and Optical Fiber Communication, San Diego, CA Feb. 21, 1999, pp. 30–32.

Yoon, Byeongho, Seo, Wanseok and Lee, Sangrok, Active Channel Power Equalization Using a Reverse Path of Awg Multiplier in WDM Systems, 25th European Conference on Optical Communication, (ECOC '99), Nice, France, Sep. 27–30, 1999, vol. II, pp 186–187, Sep. 26, 1999.

* cited by examiner

Primary Examiner—Rodney Bovernick
Assistant Examiner—Juliana K. Kang
(74) Attorney, Agent, or Firm—Fitch, Even, Tabin & Flannery

(57) ABSTRACT

A part of a wavelength division multiplexed optical signal output from a multiplexing area is extracted as a check signal, and then the extracted signal is guided to a multiplexing area. A reentered check signal is detected at a facet located opposite a facet from which the check signal has been reentered, and the state of the detected check signal is determined. Furthermore at need, on the basis of the result of the determination, a control signal is output that controls operations of a plurality of optical signals input to the multiplexing area.

30 Claims, 27 Drawing Sheets

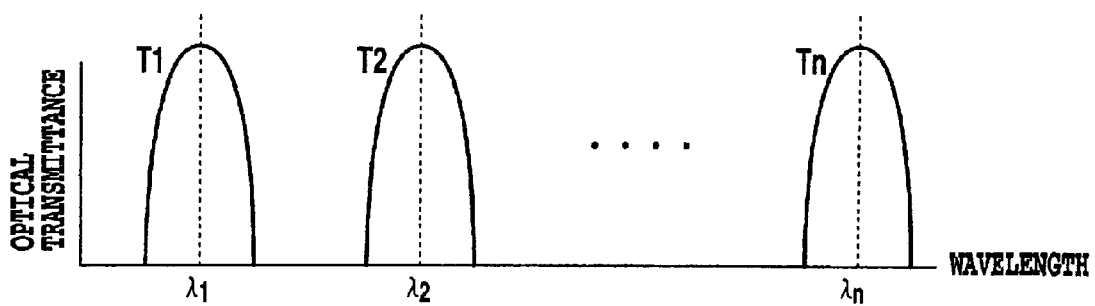

COMBINE AND DISPLAY OPTICAL TRANSMISSION CHARACTERISTICS BETWEEN INPUT TRANSMISSION CHANNEL WAVEGUIDES T1, T2, ..., Tn AND OUTPUT TRANSMISSION CHANNEL WAVEGUIDE T0

FIG.2A

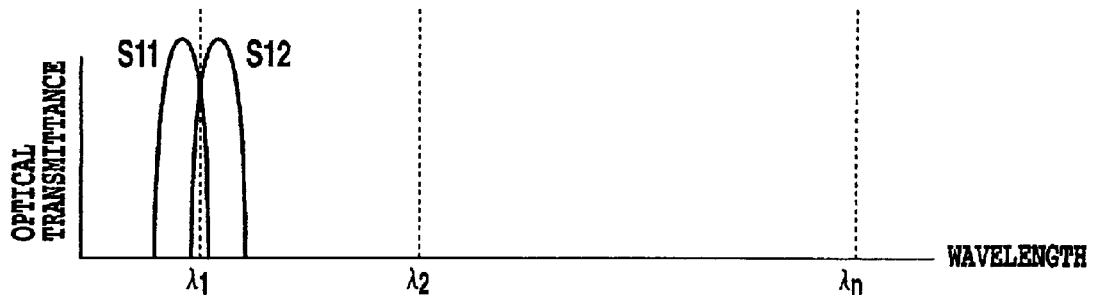

OPTICAL TRANSMISSION CHARACTERISTICS BETWEEN INPUT MONITORING CHANNEL WAVEGUIDES S11, S12 AND OUTPUT MONITORING CHANNEL WAVEGUIDE S0

FIG.2B

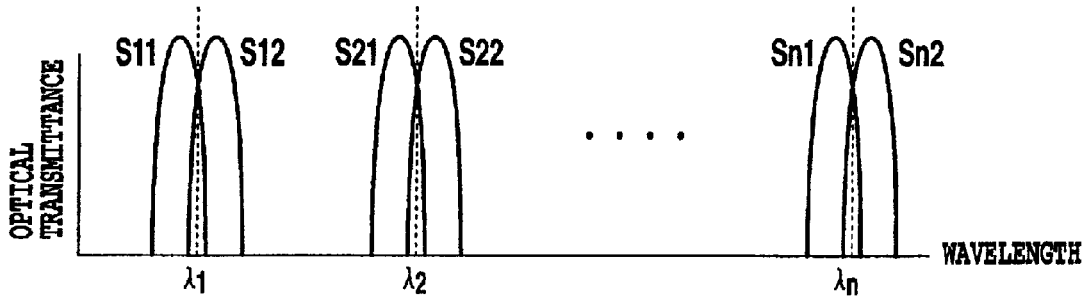

COMBINE AND DISPLAY OPTICAL TRANSMISSION CHARACTERISTICS BETWEEN GROUP OF INPUT MONITORING CHANNEL WAVEGUIDES AND OUTPUT MONITORING CHANNEL WAVEGUIDE S0

FIG.2C

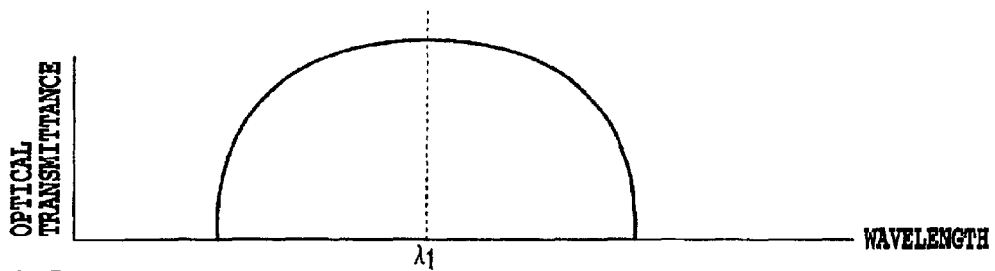
FIG.9A OPTICAL TRANSMISSION WAVELENGTH CHARACTERISTIC BETWEEN T1 AND T0
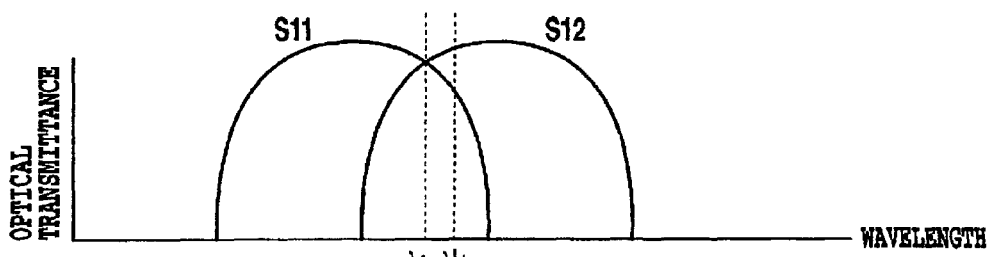
FIG.9B OPTICAL TRANSMISSION WAVELENGTH CHARACTERISTICS BETWEEN S0 AND S11, S12
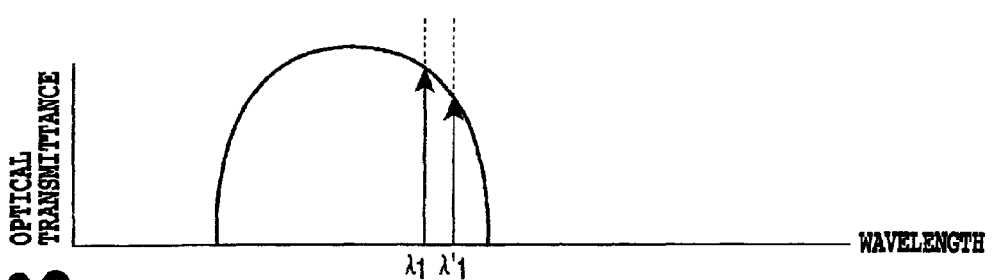
FIG.9C OPTICAL TRANSMISSION WAVELENGTH CHARACTERISTIC BETWEEN S0 AND S11
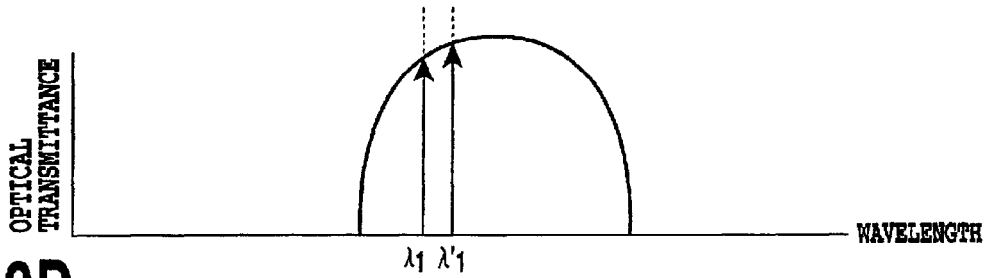
FIG.9D OPTICAL TRANSMISSION WAVELENGTH CHARACTERISTIC BETWEEN S0 AND S12

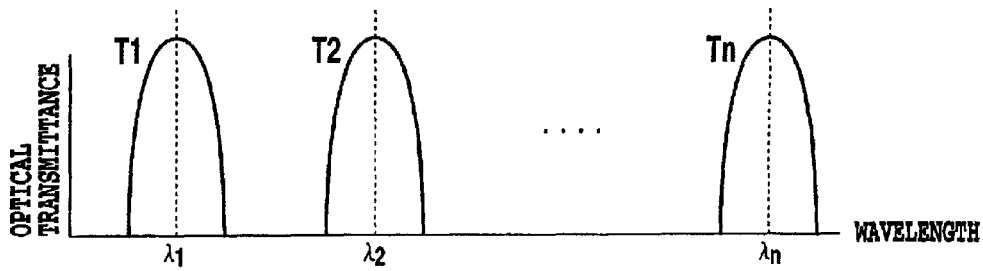

FIG.11A COMBINE AND DISPLAY OPTICAL TRANSMISSION CHARACTERISTICS BETWEEN INPUT TRANSMISSION CHANNEL WAVEGUIDES T1, T2, ..., Tn AND OUTPUT TRANSMISSION CHANNEL WAVEGUIDE T0

FIG.11B OPTICAL TRANSMISSION CHARACTERISTICS BETWEEN INPUT MONITORING CHANNEL WAVEGUIDE S1 AND OUTPUT MONITORING CHANNEL WAVEGUIDES S011, S012

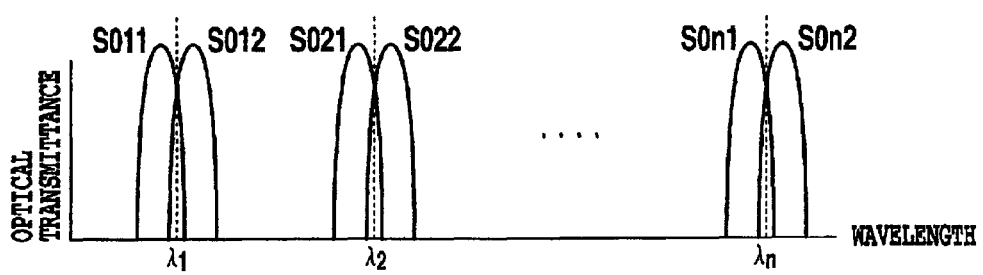

FIG.11C COMBINE AND DISPLAY OPTICAL TRANSMISSION CHARACTERISTICS BETWEEN INPUT MONITORING CHANNEL WAVEGUIDE S1 AND GROUP OF OUTPUT MONITORING CHANNEL WAVEGUIDES S011, S012, S021, S022, ..., S0n1, S0n2

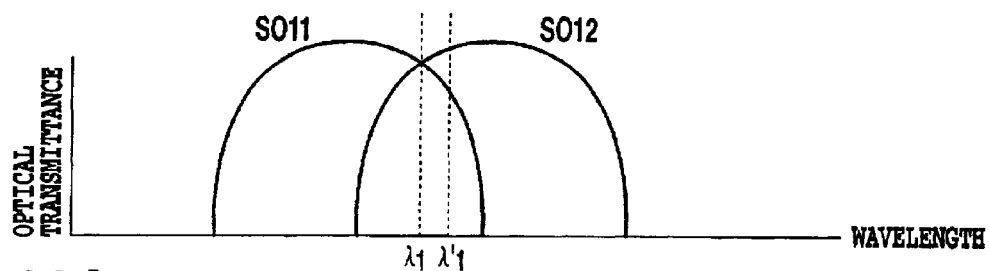
FIG.16A  OPTICAL TRANSMISSION WAVELENGTH
CHARACTERISTICS BETWEEN SI AND SO11, SO12
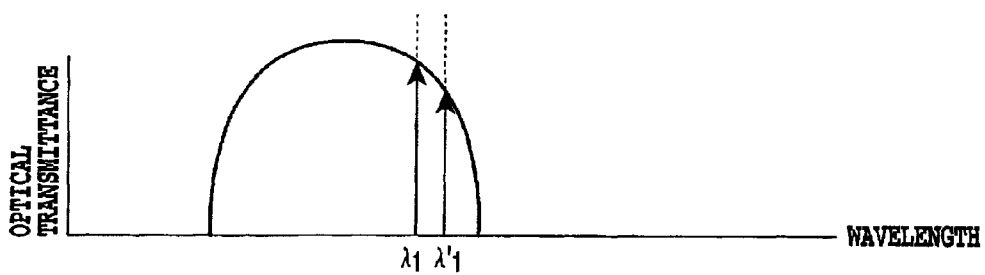
FIG.16B  OPTICAL TRANSMISSION WAVELENGTH
CHARACTERISTIC BETWEEN SI AND SO11
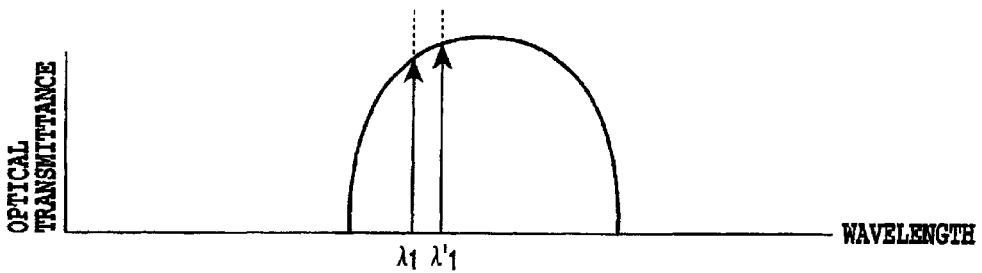
FIG.16C  OPTICAL TRANSMISSION WAVELENGTH
CHARACTERISTIC BETWEEN SI AND SO12

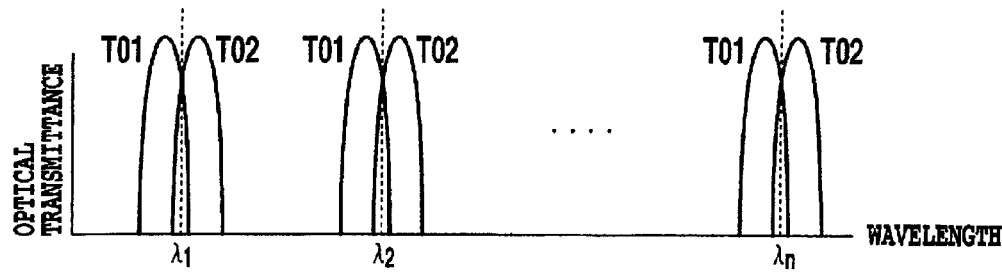

(b) COMBINE AND DISPLAY OPTICAL TRANSMISSION
CHARACTERISTICS BETWEEN INPUT TRANSMISSION CHANNEL
WAVEGUIDES T1, T2, ..., Tn AND OUTPUT TRANSMISSION
CHANNEL WAVEGUIDES T011, T012

FIG.18A

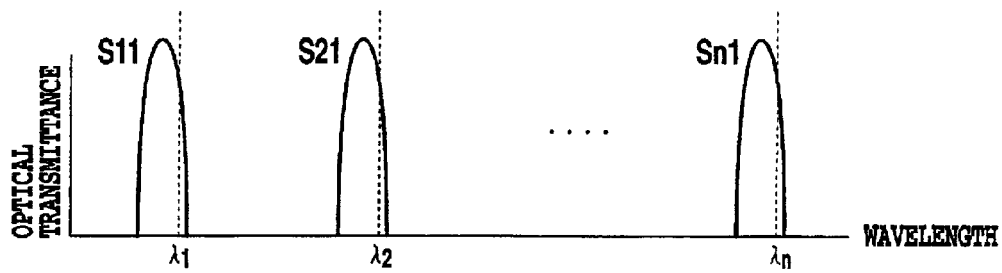

(c) COMBINE AND DISPLAY OPTICAL TRANSMISSION
CHARACTERISTICS BETWEEN INPUT MONITORING CHANNEL WAVEGUIDES
S11, S21, ..., Sn1 AND OUTPUT MONITORING CHANNEL WAVEGUIDE S01

FIG.18B

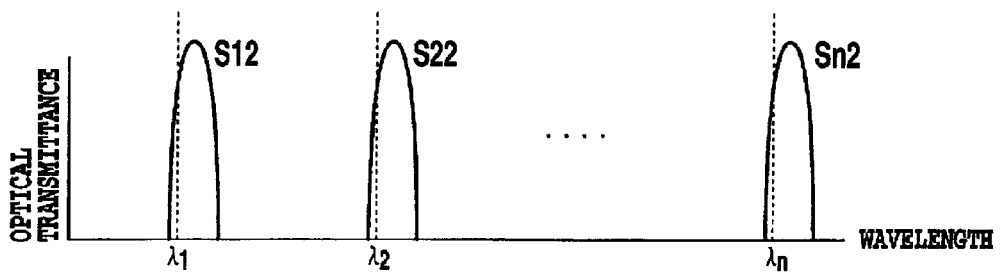

(d) COMBINE AND DISPLAY OPTICAL TRANSMISSION
CHARACTERISTICS BETWEEN INPUT MONITORING CHANNEL WAVEGUIDES
S12, S22, ..., Sn2 AND OUTPUT MONITORING CHANNEL WAVEGUIDE S02

FIG.18C

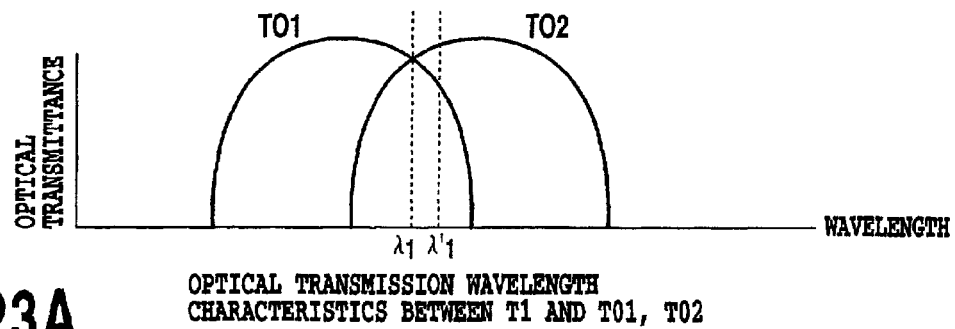
FIG.23A OPTICAL TRANSMISSION WAVELENGTH CHARACTERISTICS BETWEEN T1 AND T01, T02
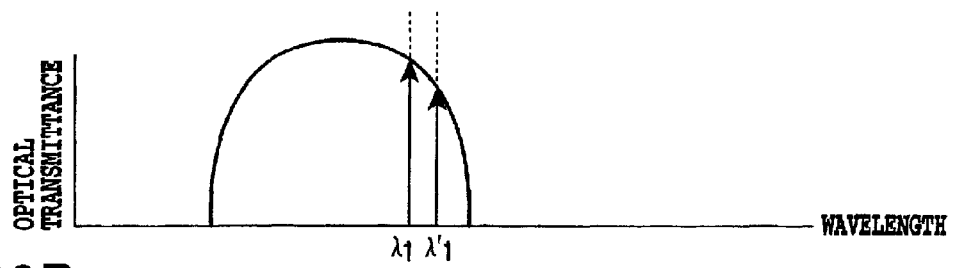
FIG.23B OPTICAL TRANSMISSION WAVELENGTH CHARACTERISTIC BETWEEN S01 AND S11
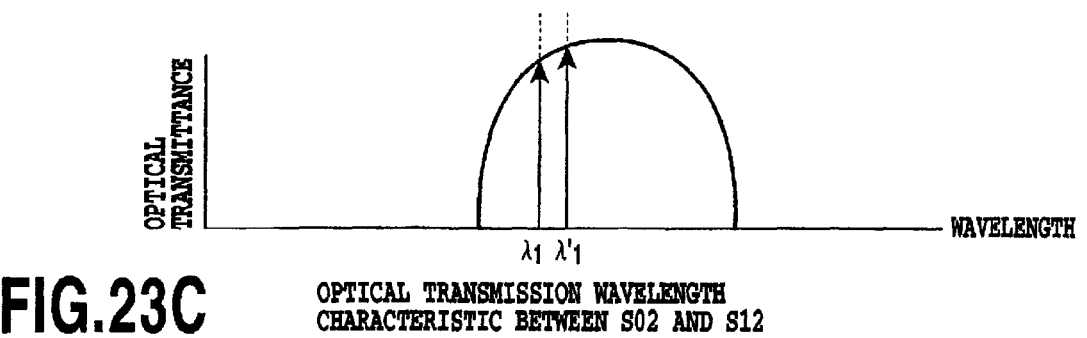
FIG.23C OPTICAL TRANSMISSION WAVELENGTH CHARACTERISTIC BETWEEN S02 AND S12

(c) OPTICAL TRANSMISSION CHARACTERISTIC BETWEEN #1 AND *j (d) OPTICAL TRANSMISSION CHARACTERISTIC BETWEEN #2 AND *j (e) SYNTHESIZE AND DISPLAY OPTICAL TRANSMISSION CHARACTERISTICS BETWEEN #1, #2, ..., #n AND *j

OPTICAL MULTIPLEXING CIRCUIT AND OPTICAL MULTIPLEXER

This application is based on Patent Application No. 2001-53053 filed Feb. 27, 2001 in Japan, the content of which is incorporated hereinto by reference.

BACKGROUND OF THE INVENTION

1. Field of the Invention

The present invention is applicable to an optical multiplexing circuit that multiplexes a plurality of optical signal together, and particularly, to an optical multiplexer applicable to an arrayed-waveguide grating type optical multiplexing circuit having a wavelength monitoring function for wavelength division multiplexing optical communication.

2. Description of the Related Art

FIG. 25 shows an arrayed-waveguide grating (AWG) type optical multiplexing and demultiplexing circuit utilizing multiple beams interference.

A structure of common arrayed-waveguide gratings will be described. Reference numeral 100 denotes a substrate composed of silicon or silica. A lower clad layer composed of a silicon oxide layer or the like is formed on the substrate 100. A silicon dioxide layer or the like is deposited on the lower clad layer and is doped with germanium as impurities to increase the refractive index thereof relative to that of the lower clad layer. This silicon layer is patterned to form a core layer. Further, an upper clad layer composed of a silicon oxide layer or the like is formed on the core layer. These three layers constitute an optical waveguide.

The optical multiplexing and demultiplexing circuit shown in FIG. 25 is composed of components 101 to 105, described below. That is, a reference numeral 101 denotes a plurality of input channel waveguides, a reference numeral 102 denotes an input slab waveguide, and a reference numeral 103 denotes an array waveguide that is substantially composed of a plurality of parallel waveguides of different lengths. Further, a reference numeral 104 denotes an output slab waveguide, and a reference numeral 105 denotes a plurality of output channel waveguides.

Such an array-waveguide grating type optical multiplexing and demultiplexing circuit can be used for both multiplexing and demultiplexing.

First, explanation will be given of functions of this circuit provided when it serves as an optical multiplexing circuit.

In an optical wavelength multiplexing communication method, a plurality of optical signals each having a predetermined wavelength and the multiplexed signal is transmitted through a single fiber. A wavelength of the transmitted optical signal is standardized and its method is recommended by the ITU (International Telecommunication Union). This recommendation specifies optical signals each having a same interval wavelength incrementing by a frequency of 100 or 50 GHz or the like. Common optical signals have a wavelength of one of these values or one-integer-th thereof (for example, a half or quarter thereof).

Such a plurality of optical signals having different wavelengths are input to the input ends of predetermined input channel waveguides 101, which are located at a facet of the substrate 100 via a plurality of optical waveguides or fibers. These optical signals pass through the input channel waveguides 101 and are guided to one facet of the input slab waveguide 102. Then, the guided signals are radiated from facet of the input channel waveguides 101 geometrically arranged at the above one facet of the input slab waveguide 102, and then input to the plurality of array waveguides 103 geometrically arranged at the other facet of the input slab waveguide 102.

The optical signals of the plural wavelength input to the array waveguides 103 travel through these waveguides, and have phase differences corresponding to differences in the lengths of the waveguides until they reach the other facet. The signals are then radiated in the output slab waveguide 104. The radiated optical signals interfere with each other and are condensed at the inlets of predetermined output channel waveguides 105. Then, the signals are multiplexed together and the multiplexed signal is output from a predetermined output channel waveguide 105. The multiplexed signal is provided to the exterior via an optical waveguide or an optical fiber connected to the output channel waveguide 105 at the corresponding facet of the substrate.

If the circuit is thus used as an optical multiplexing circuit, as many input channel waveguides 101 as wavelengths to be multiplexed as well as a single output channel waveguide 105 are commonly used.

In this description, one end of the arrayed-waveguide grating type optical multiplexing and demultiplexing circuit is defined as an input side, whereas the other end is defined as an output side. However, if the arrayed-waveguide grating type optical multiplexing and demultiplexing circuit is constructed to be symmetrical with respect to the array waveguides, then the input and output sides may be reversed. That is, if a multiplexed signal obtained by multiplexing optical signals of different wavelengths is input to the above described output channel waveguide from which the multiplexed output is obtained, then the optical signal travels in the direction opposite to that described above and is demultiplexed into predetermined input channel waveguides for output.

That is, if the arrayed-waveguide grating type optical multiplexing and demultiplexing circuit is used as an optical demultiplexing circuit, then it may be used in the opposite manner compared to the above described multiplexing circuit. That is, if this circuit is used as an optical demultiplexing circuit, a single input channel waveguide and as many output channel waveguides as wavelengths to be demultiplexed are used.

It is effective in forming a plurality of arrayed-waveguide grating type optical multiplexing and demultiplexing circuits on the same substrate as well as downsizing.

FIG. 26 schematically shows the input and output channel waveguides of the arrayed-waveguide grating type optical multiplexing and demultiplexing circuit. The characteristics of the multiplexing circuit will be described below.

Here, reference symbols #1, #2, . . . , #n denote input channel waveguides, and reference symbols *1, *2, . . . , *n denote output channel waveguides. If a plurality of optical signals each having an interval wavelength such as 100 or 50 GHz, as described previously, are sequentially input to the input channel waveguides #1, #2, . . . , #n so that the channel waveguides receive the optical signals of the corresponding wavelengths from short to long wavelengths or from long to short wavelengths, then the output channel waveguide from which a multiplexed output is obtained is denoted as *J.

FIG. 27A shows the optical transmitted wavelength characteristics of the input channel waveguide #1 and output channel waveguide *J in FIG. 26.

The axis of ordinates denotes optical transmittance, indicating that an upper part of the axis of ordinates is associated with a higher optical transmittance and weaker optical attenuation. That is, if a predetermined wavelength $\lambda_1$ is input to the input transmission channel waveguides #1, optical signals having wavelengths near the wavelength $\lambda_1$ are transmitted. If the wavelength changes from $\lambda_1$ to a smaller or larger value, the optical transmittance decreases to increase transmission losses, causing wavelengths sufficiently distant from the wavelength $\lambda_1$ to be very sharply attenuated.

The optical transmission wavelength characteristic is such that wavelengths near a center wavelength, which has the highest transmittance, generally exhibit a Gauss type, as shown in FIG. 27A. However, many efforts have been made to achieve a flat optical transmission wavelength characteristic within a predetermined wavelength range. The Gauss type will be described below by way of example.

Likewise, FIG. 27B shows the optical transmission wavelength characteristics of the input channel waveguide #2 and output channel waveguide *J in FIG. 26. Furthermore, FIG. 27C shows the synthesized optical transmission wavelength characteristics of the input channel waveguides #1, #2, . . . , #n and output channel waveguide *J in FIG. 26.

These figure indicate that if optical signals of the wavelengths $\lambda_1, \lambda_2, \ldots, \lambda_n$ are input to the input channel waveguides #1, #2, . . . , #n, respectively, they are multiplexed and output to the output channel waveguide *J.

Further, these figures also indicate an optical transmission wavelength characteristic observed in the following situation: if the circuit is used as a demultiplexing circuit as described previously, if a signal obtained by multiplexing optical signals of the wavelengths $\lambda_1, \lambda_2, \ldots, \lambda_n$ is input to the output channel waveguide *J, it is demultiplexed into n signals, which are then output to the input channel waveguides #1, #2, . . . , #n.

The above described characteristics of the optical multiplexing circuit are determined by both a waveguide width and a shape, or, both an installation position and an interval measured near the facet of the slab waveguide of the channel waveguides. These relations have been widely disclosed.

The operational principle and basic functions of the above described AWG optical multiplexing and demultiplexing circuit are disclosed in, for example, Japanese Patent No. 2599786, Japanese Patent Application Laid-open No. 5-313029 (1993), and other applications.

Optical transmitters require the optical wavelength multiplexing number to be increased in order to improve the transmission efficiency of an optical communication system. The wavelength multiplexing number n thus tends to be 16 to 32 channels or more. Accordingly, the interval between the predetermined optical signal wavelengths $\lambda_1, \lambda_2, \ldots, \lambda_n$ has decreased from the conventional value of 100 GHz to 50 GHz and will be smaller. Consequently, AWG optical multiplexing and demultiplexing circuits and peripheral circuits thereof must meet more strict specifications.

Optical oscillation circuits and electrooptic conversion circuits generally comprise laser diodes, and the stability of the oscillation wavelength of these circuits must meet such a strict specification. For example, the wavelength, which needed to be controlled to be equal to or less than ±10 GHz, now needs to be controlled to be equal to or less than ±5 GHz, and thus optical oscillation circuits must stabilize optical emission wavelength more precisely. To precisely control the optical wavelength, a method of controlling the temperature of laser diodes or the like is used.

Further, for example, Japanese Patent Application Laid-open Nos. 2000-65686 and 2000-78085 have proposed a circuit configuration for a wavelength multiplexing transmitter in which a receiver uses a demultiplexing circuit to demultiplex a received wavelength multiplexed signal into optical signals of different wavelengths and then these wavelengths are monitored and controlled for displacement from a predetermined wavelength. In these specifications, conventional optical multiplexing and demultiplexing circuits are used as simple multiplexing and demultiplexing functions, thereby requiring a peripheral circuit different from the optical multiplexing and multiplexing circuits to have a more complicated circuit configuration.

In short, in the prior art, the demultiplexing circuit is externally installed, and the deviations of the wavelengths of signals obtained by demultiplexing are detected by a filter or the like so as to control the wavelength of an electrooptic conversion circuit, that is, laser diodes, on the basis of the results of the detection. Consequently, the scale and size of the circuit must be increased.

In particular, as the wavelength multiplexing number increases to 16 to 32, implementation becomes more and more difficult and more and more costs are required.

SUMMARY OF THE INVENTION

It is thus an object of the present invention to provide an optical multiplexer that is structured by a simple circuit configuration and performs a precisely control of optical wavelengths.

In the first aspect of the present invention, there is provided an optical multiplexing circuit to which a plurality of optical signals are input and which outputs a multiplexed beam subjected to wavelength division multiplexing, comprising:

a plurality of input transmission channel waveguides to each of which a corresponding one of a plurality of optical signals is input;

plural pairs of input monitoring channel waveguides into which a beam is introduced in a direction opposite to that for the input transmission channel waveguides and which output demultiplexed beams, each of the pairs including a first input monitoring channel waveguide and a second input monitoring channel waveguide;

an input slab waveguide having a first facet, wherein the first facet connected to the plurality of input transmission channel waveguides and the plural pairs of input monitoring channel waveguides;

at least one output transmission channel waveguide to which the multiplexed beam is guided, the multiplexed beam being obtained by multiplexing the plurality of optical signals transmitted from the plurality of input transmission channel waveguides;

at least one output monitoring channel waveguide into which a beam is introduced in a direction opposite to that for the output transmission channel waveguides and which transmits the demultiplexed beams to the plural pairs of input monitoring channel waveguides;

an output slab waveguide having a fourth facet, wherein the fourth facet connected to the at least one output transmission channel waveguide and the at least one output monitoring channel waveguides; and an arrayed waveguide comprising a plurality of optical waveguides having different optical path lengths, wherein the arrayed waveguide is connected to a second facet which is located opposite the first facet of the input slab waveguide, and is connected to a third facet which is located opposite the fourth facet of the output slab waveguide, wherein when the multiplexed beam is introduced into the fourth facet of the output slab waveguide through the output monitoring channel waveguide, the multiplexed light passes through the output slab waveguide and is demultiplexed by the input slab waveguide, and the demultiplexed beams are guided to the first facet and are output to the each pair of input monitoring channel waveguides having a corresponding wavelength.

In the second aspect of the present invention, there is provided an optical multiplexing circuit to which a plurality of optical signals are input and which outputs a multiplexed beam subjected to wavelength division multiplexing, comprising:

a plurality of input transmission channel waveguides to each of which a corresponding one of a plurality of optical signals is input;

at least one input monitoring channel waveguide into which a beam is introduced in the same direction as that for the input transmission channel waveguides and to which a multiplexed beam is input;

an input slab waveguide having a first facet, wherein the first facet connected to the plurality of input transmission channel waveguides and the at least one input monitoring channel waveguide;

at least one output transmission channel waveguide to which the multiplexed beam is guided, the multiplexed beam being obtained by multiplexing the plurality of optical signals transmitted from the plurality of input transmission channel waveguides;

plural pairs of output monitoring channel waveguides into which a beam is introduced in the same direction as that for the output transmission channel waveguides and to which the demultiplexed beams transmitted from the input monitoring channel waveguide are input, each of the pairs comprising a first output monitoring channel waveguide and a second output monitoring channel waveguide;

an output slab waveguide having a fourth facet, wherein the fourth facet connected to the at least one output transmission channel waveguide and the plural pairs of output monitoring channel waveguides; and an arrayed waveguide comprising a plurality of optical waveguides having different optical path lengths, wherein the arrayed waveguide is connected to a second facet which is located opposite the first facet of the input slab waveguide, and is connected to a third facet which is located opposite the fourth facet of the output slab waveguide, wherein when the multiplexed beam is introduced into the first facet of the input slab waveguide through the input monitoring channel waveguide, the multiplexed light passes through the input slab waveguide and is demultiplexed by the output slab waveguide, and the demultiplexed beams are guided to the fourth facet and are output to each pair of output monitoring channel waveguides having corresponding wavelengths.

In the third aspect of the present invention, there is provided an optical multiplexing circuit to which a plurality of optical signals are input and which outputs a multiplexed beam subjected to wavelength division multiplexing, comprising:

a plurality of input transmission channel waveguides to each of which a corresponding one of a plurality of optical signals is input;

plural pairs of input monitoring channel waveguides into which a beam is introduced in a direction opposite to that for the input transmission channel waveguides and which output demultiplexed beams, each of the pairs including a first input monitoring channel waveguide and a second input monitoring channel waveguide;

an input slab waveguide having a first facet, wherein the first facet connected to the plurality of input transmission channel waveguides and the plural pairs of input monitoring channel waveguides;

a pair of a first output transmission channel waveguide and a second output transmission channel waveguide to which the multiplexed beam is guided, the multiplexed beam being obtained by multiplexing the plurality of optical signals transmitted from the plurality of input transmission channel waveguides;

a pair of a first output monitoring channel waveguide and a second output monitoring channel waveguide into which a beam is introduced in a direction opposite to that for the pair of output transmission channel waveguides and which transmits the demultiplexed beams to the plural pairs of input monitoring channel waveguides;

an output slab waveguide having a fourth facet, wherein the fourth facet connected to the pair of the first and second output transmission channel waveguide and the pair of the first and second output monitoring channel waveguides; and an arrayed waveguide comprising a plurality of optical waveguides having different optical path lengths, wherein the arrayed waveguide is connected to a second facet which is located opposite the first facet of the input slab waveguide, and is connected to a third facet which is located opposite the fourth facet of the output slab waveguide, wherein when beams obtained by dividing the multiplexed beam are introduced into the fourth facet of the output slab waveguide through the pair of output monitoring channel waveguides, the beams passes through the output slab waveguide and is demultiplexed by the input slab waveguide, and the demultiplexed beams are guided to the first facet and are output to each pair of input monitoring channel waveguides having a corresponding wavelength.

In the fourth aspect of the present invention, there is provided an optical multiplexer having an optical multiplexing circuit to which a plurality of optical signals are input and which outputs a multiplexed beam subjected to wavelength division multiplexing, the multiplexer comprising:

extracting means for extracting a part of the multiplexed beam output from the optical multiplexing circuit to extract a check signal;

check signal reintroducing means for reintroducing the extracted check signal into the optical multiplexing circuit; and check signal detecting means for detecting the check signal reintroduced into the multiplexing area, at a facet located opposite the facet into which the signal has been reintroduced.

The above and other objects, effects, features and advantages of the present invention will become more apparent from the following description of embodiments thereof taken in conjunction with the accompanying drawings.

BRIEF DESCRIPTION OF THE DRAWINGS

FIGS. 2A to 2C are characteristic diagrams showing an optical transmission characteristic representative of a relationship between wavelength and optical transmittance;

FIGS. 9A to 9D are characteristic diagrams showing an optical transmission characteristic representative of the relationship between wavelength and optical transmittance;

FIGS. 11A to 11C are characteristic diagrams showing an optical transmission characteristic representative of the relationship between wavelength and optical transmittance;

FIGS. 16A to 16C are characteristic diagrams showing an optical transmission characteristic representative of the relationship between wavelength and optical transmittance;

FIGS. 18A to 18C are characteristic diagrams showing an optical transmission characteristic representative of the relationship between wavelength and optical transmittance;

FIGS. 23A to 23C are characteristic diagrams showing an optical transmission characteristic representative of the relationship between wavelength and optical transmittance;

DETAILED DESCRIPTION OF PREFERRED EMBODIMENTS

Embodiments of the present invention will be described below with reference to the drawings.

FIRST EXAMPLE

A first embodiment of the present invention will be described with reference to FIGS. 1 to 9.

OUTLINE

First, an outline of the present invention will be provided.

On the basis of advanced optical signal process functions inherently possessed by an AWG optical multiplexing and demultiplexing circuit conventionally used only as a simple optical multiplexing and demultiplexing circuit, the present invention proposes an improved optical multiplexing and demultiplexing circuit having a support function of stabilizing and controlling oscillation wavelength, instead of a simple optical multiplexing and demultiplexing circuit.

The advanced optical signal process functions inherently possessed by the AWG optical multiplexing and demultiplexing circuit are shown in, for example, Japanese Patent Application Laid-open No. 6-232843 (1994) or the like, and Japanese Patent Application Laid-open No. 2000-65686, described previously, uses an AWG optical multiplexing circuit having special functions, as a peripheral circuit for controlling wavelength. Thus, these functions are known as fragmentary basic techniques, but no AWG optical multiplexing and demultiplexing circuits having advanced functions for the above purpose have been proposed or implemented.

Thus, the present invention has the following configuration requirements.

Figure 1:
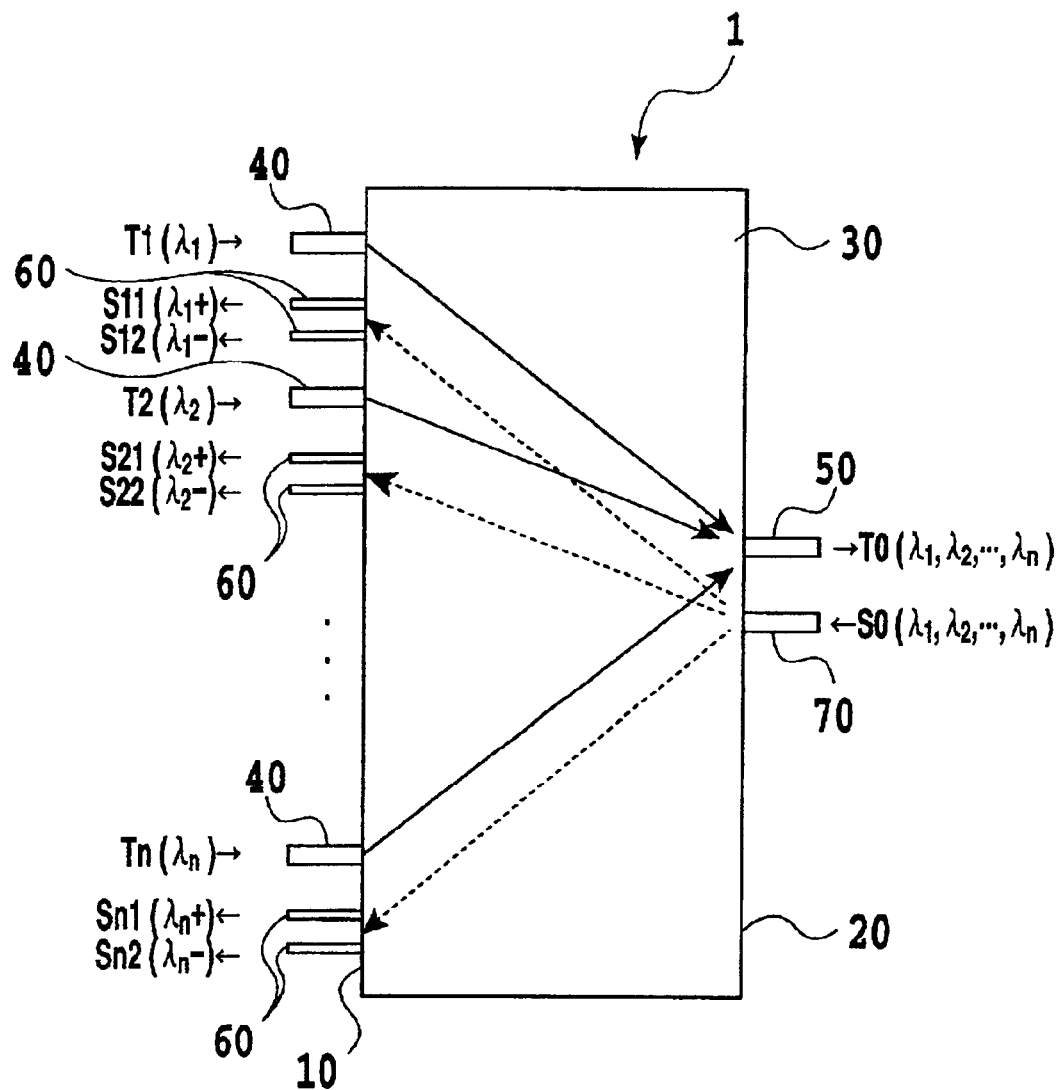
FIG. 1 is a block diagram showing a configuration of an optical multiplexing circuit as a first embodiment of the present invention.
Figure 7:
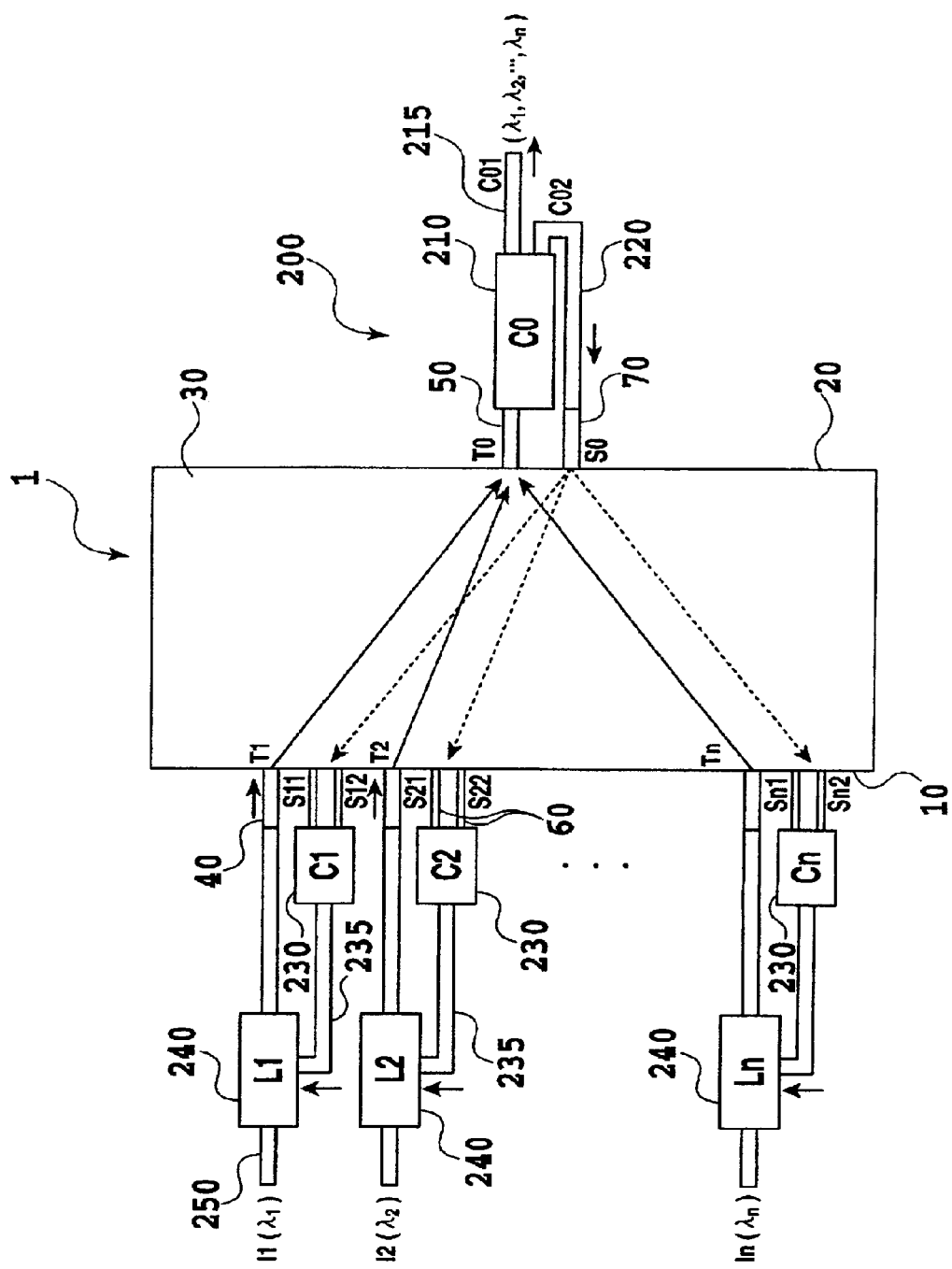
FIG. 7 is a block diagram showing a configuration of a wavelength control circuit.

In FIGS. 1 and 7, described later, the optical multiplexer has a function that inputs a plurality of optical signals through one facet 10 (that is, the input channel waveguides 101 in FIG. 25, described previously) of a multiplexing area 30 (that is, the components 101 to 105), multiplexes the inputted optical signals, and outputs a single wavelength division multiplexed optical signal from the other facet 20 (that is, the output channel waveguide 105) of the multiplexing area 30, and is characterized by comprising:

extracting means (50, 210) for extracting a part of the wavelength division multiplexed optical signal output from the output facet 20 of the multiplexing area 30 to obtain a check signal; check signal reintroducing means (220, 70) for introducing the extracted check signal into the multiplexing area 30 again; check signal detecting means (60) for detecting the check signal input to the multiplexing area 30 again at the facet 10 located opposite the facet 20 from which the check signal has been input again; and an operation control means (230) for determining the state of the detected check signal to output a control signal for controlling a plurality of optical signals input to the multiplexing area 30 based on a result of the determination.

In this example, the components of the optical multiplexer are constructed as follows.

The extracting means has a branching section (210) that branches a part of the wavelength division multiplexed optical signal output from the output facet 20 to obtain a check signal.

The check signal reintroducing means has first check terminal sections (220, 70), connected to the branching section (210), having an optical transmission wavelength bandwidth and an optical transmission wavelength characteristic equal to those of transmission waveguides 40 that transmit a plurality of optical signals, and installed at the output facet 20.

The check signal detecting means has a second check terminal section (60) installed at the same facet 10 as that for the input terminal 101 and having a predetermined optical transmission wavelength characteristic. For example, the optical transmission wavelength characteristic is set so as to have a bandwidth about half of the optical transmission wavelength bandwidth of the transmission waveguides 40 transmitting a plurality of optical signals and to form two overlapping mountains, and in the optical transmission wavelength characteristic the center wavelength of the wavelength bands of the two overlapping mountains substantially equals a wavelength used as a reference corresponding to each of the plurality of transmitted optical signals.

With the above configuration, the wavelength multiplexed optical signal output from the output facet 20 of the multiplexing area 30 is branched by the branching section (210) to extract a check signal. The extracted check signal obtained is introduced into the multiplexing area 30 from the first check terminal sections (220, 70) again and output from the second check terminal sections (60) as two check signals. On the basis of the output check signal, a control signal is output.

By using the thus calculated control signal, an operation control section 240 can monitor and control the displacement of the wavelength of the optical signal input to the multiplexing area 30.

The relationship between the width of the channel waveguide and the optical transmission wavelength band is not uniquely determined but this width and the optical transmission wavelength band are definitely correlated to each other. That is, the wider the width of the channel waveguide is, the wider the optical transmission wavelength band is.

Further, making the optical transmission wavelength band of a pair of channel waveguides narrow compared to the optical transmission wavelength band of a transmission channel waveguide, that is, making the width of the pair of monitoring channel waveguides narrow the width of the input transmission channel waveguide, thus downsizing of the optical multiplexing circuit.

A specific example will be described below.

SPECIFIC EXAMPLE

Now, a specific configuration of an optical multiplexer according to the present invention will be described with reference to FIGS. 1 to 9.

The optical multiplexer according to the present invention is roughly divided into an optical multiplexing circuit 1 including the multiplexing area 30, and a wavelength control circuit 200 having a function of monitoring and controlling the wavelength of an optical signal.

Figure 25:
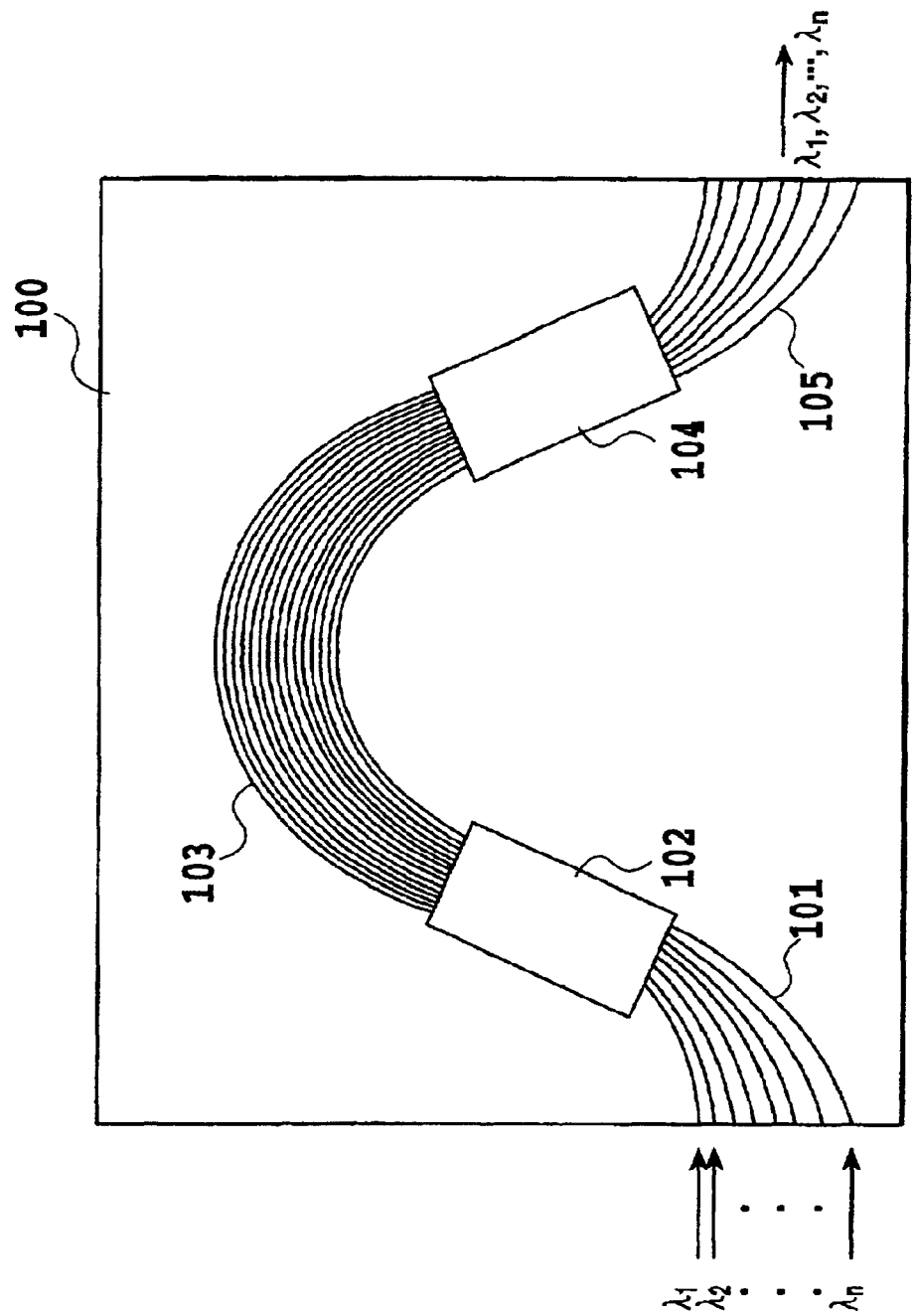
FIG. 25 is a view useful in describing a configuration of a conventional optical multiplexing circuit.
Figure 26:
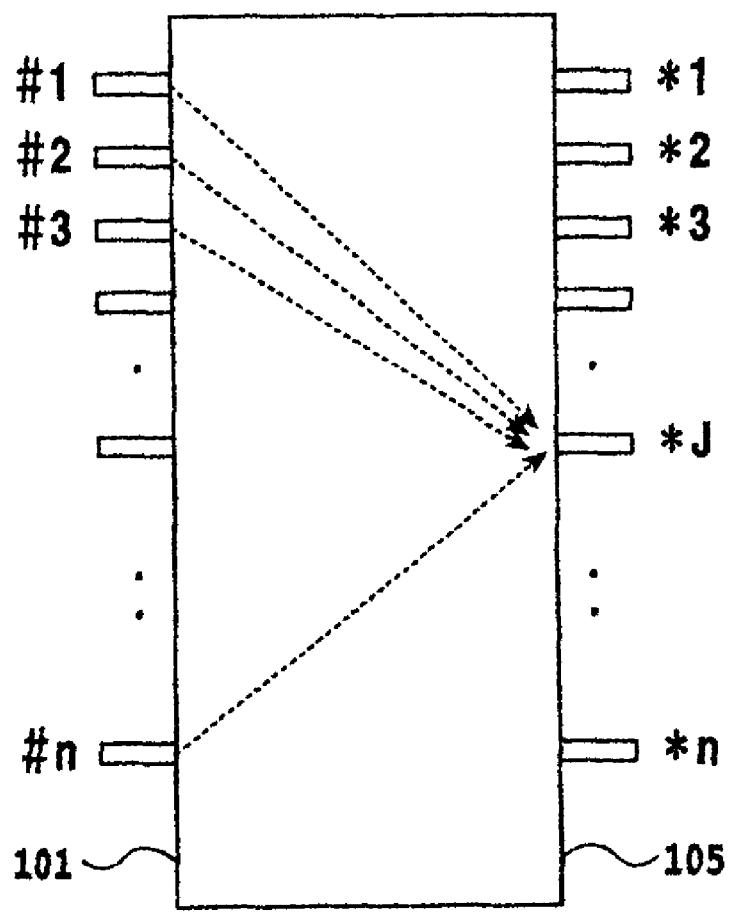
FIG. 26 is a block diagram schematically showing input and output channel waveguides in a conventional optical multiplexing circuit.
Figure 27A:
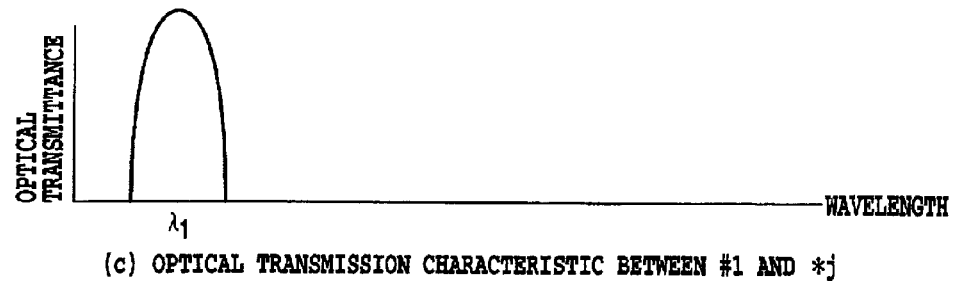
FIGS. 27A to 27C are characteristic diagrams showing an optical transmission characteristic representative of the conventional relationship between wavelength and optical transmittance.
Figure 27B:
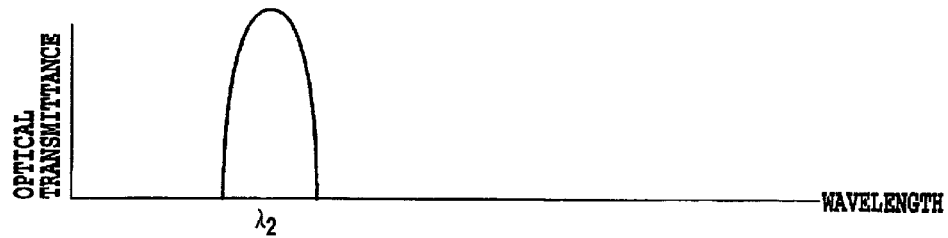
Figure 27C:
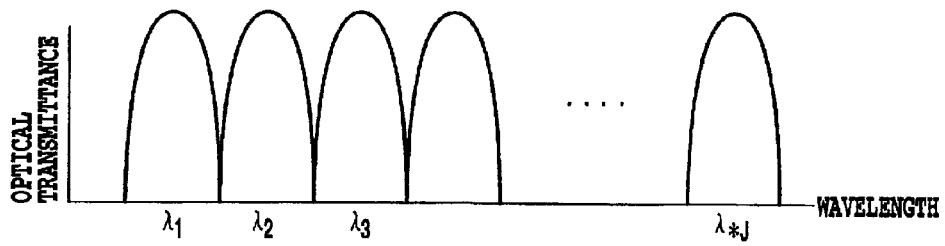

The multiplexing area 30 is composed of a plurality of input channel waveguides 101 provided corresponding to a plurality of optical signals (wavelengths $\lambda_1, \lambda_2, \ldots, \lambda_n$), an input slab waveguide 102, an arrayed waveguide 103 composed of a plurality of optical waveguides with different optical path lengths, an output slab waveguide 104, and a plurality of output channel waveguides 105, as shown in FIG. 25 for the conventional example, described previously.

The wavelength control circuit 200 is composed of the areas other than the multiplexing area 30, and will be described in detail with reference to FIGS. 7 to 9, described later.

(Optical Multiplexing Circuit)

First, the optical multiplexing circuit will be described with reference to FIGS. 1 to 3.

FIG. 1 shows a configuration of the arrayed-waveguide grating type optical multiplexing circuit 1 according to the present invention.

Reference numeral 10 corresponds to an input facet of the input slab waveguide 102, shown in FIG. 25. Reference numeral 20 corresponds to an output facet of the output slab waveguide 104, shown in FIG. 25. Thus, the multiplexing area 30 between the input facet 10 and the output facet 20 corresponds to the area including the components (input slab waveguide 102, arrayed waveguide 103, and output slab waveguide 104) in FIG. 25. The connection between the input slab waveguide 102 and the output slab waveguide 104 will be described in further detail.

FIG. 1 shows a configuration of the input facet 10 and output facet 20 of the optical multiplexing circuit 1, including the multiplexing area 30.

(Input End Surface)

The input facet 10 is provided with the following members 40 and 60.

Reference numeral 40 denotes input transmission channel waveguides. The plurality of transmission channel waveguides 40 constitute a group of transmission channel waveguides (T1, T2, . . . , Tn).

Reference numeral 60 denotes monitoring channel waveguides. The plural pairs of monitoring channel waveguides 60 constitute a group of monitoring channel waveguides ((S11, S12), (S21, S22), . . . , (Sn1, Sn2)).

Here, for example, an optical transmission wavelength band of each of input monitoring channel waveguides 60 is set equal to about half of the optical transmission wavelength band of the corresponding input transmission channel waveguide 40.

In the multiplexing area 30, the input transmission channel waveguide 40 and each of monitoring channel waveguides 60 are structured as the input channel waveguide 101 of FIG. 25.

(Output End Surface)

The output facet 20 is provided with the following members 50 and 70.

Reference numeral 50 denotes an output transmission channel waveguide (T0).

Reference numeral 70 denotes an output monitoring channel waveguide (S0).

Here, for example, an optical transmission wavelength band of each of the output monitoring channel waveguides S0 is set equal to the band of the output transmission channel waveguide T0.

In the multiplexing area 30, the output transmission channel waveguide 50 and the output monitoring channel waveguide 70 are structured as the output channel waveguide 105 of FIG. 25.

(Installation Positions of the Waveguides)

The output transmission channel waveguide T0 is arranged at such a predetermined position so that, on condition that optical signals of the wavelengths $\lambda_1, \lambda_2, \ldots, \lambda_n$ are input to the input transmission channel waveguides T1, T2, . . . , Tn in the output slab waveguide 104, the optical signals are multiplexed in the multiplexing area 30 and then output.

Further, the input group of monitoring channel waveguides (S11, S12), (S21, S22), . . . , (Sn1, Sn2) are arranged at such positions so that, on condition that multiplexed signals (that is, signals obtained by extracting a part of a wavelength multiplexed signal composed of optical signals of the wavelengths $\lambda_1, \lambda_2, \ldots, \lambda_n$) are input to the output monitoring channel waveguide S0 in the input slab waveguide 102, the multiplexed signals are demultiplexed in the multiplexing area 30 and then output to the corresponding pairs of input monitoring channel waveguides, that is, the center wavelengths of the optical transmission wavelength characteristic that is obtained by synthesizing the optical transmission wavelength characteristics of the pairs of input monitoring channel waveguides (S11, S12), (S21, S22), (Sn1, Sn2) are equal to the wavelengths $\lambda_1, \lambda_2, \ldots, \lambda_n$.

(Optical Transmission Wavelength Characteristic)

In this example, in FIG. 1, the shapes and positions of the waveguides in the multiplexing area 30 determine bands, such as the pair of monitoring optical transmission wavelength bands between the pair of first or second input monitoring channel waveguides 60 and the output monitoring channel waveguides 70, and the transmission optical transmission wavelength band between the input transmission channel waveguide 40 and the output transmission channel waveguide 50. In this case, each of the monitoring optical transmission wavelength bands is narrower than or is mutually equal to the transmission optical transmission wavelength band.

Here, there is a predetermined correlationship between the predetermined interval at which each of the plurality of input transmission channel waveguides 40 is arranged and the predetermined interval corresponding to the center position of each pair among pairs of input monitoring channel waveguides 60.

The predetermined correlationship is such that the predetermined interval at which each of the input transmission channel waveguides 40 is arranged is equal or is in proportion to the predetermined interval corresponding to the center position of each pair among pairs of input monitoring channel waveguides 60.

Further, the width of respective channel waveguides constituting the pair of input monitoring channel waveguides 60 may be set smaller or larger than that of the input transmission channel waveguide 40.

In this description, each of the monitoring optical transmission wavelength bands is narrower than the transmission optical transmission wavelength band, but this condition is not essential to the present invention. That is, the overlapping part in each of the monitoring optical transmission wavelength bands each other is important in detecting the displacement of the wavelength of an optical signal, and the width of the monitoring optical transmission wavelength band does not matter.

A specific description will follow.

FIG. 2A shows the synthesized optical transmission wavelength characteristics between the input transmission channel waveguides T1, T2, . . . , Tn and the output transmission channel waveguide T0.

In this case, if an optical signal of the wavelength $\lambda_1$ is input to the input transmission channel waveguide T1, an optical signal of the wavelength $\lambda_2$ is input to the input transmission channel waveguide T2, . . . , and an optical signal of the wavelength $\lambda_n$ is input to the input transmission channel waveguide Tn, then these optical signals are synthesized and then output to the output transmission channel waveguide T0.

FIG. 2B shows the optical transmission wavelength characteristics between the pair of input monitoring channel waveguides (S11, S12) and the output monitoring channel waveguide S0.

In this case, this optical transmission wavelength characteristic is set so that the pair of input monitoring channel waveguides (S11, S12) each have a band set equal to about half of the optical transmission wavelength band of the corresponding transmission channel waveguide 40, the optical transmission wavelength characteristics between the input monitoring channel waveguides S11 and S12 form two overlapping mountains, and the intersection between the optical transmission wavelength characteristics thereof becomes equal to the wavelength $\lambda_1$.

Under these set conditions, if an optical signal of the wavelength $\lambda_1$ is input from the output monitoring channel waveguide S0, it is divided into two signals, which are then output to the input monitoring channel waveguides S11 and S12.

As shown in FIG. 2B, the division into two means that in the relationship between the wavelength bands of the monitoring channel waveguides S11 and S12, wavelength areas are located over and under the wavelength $\lambda_1$, respectively.

Thus, if, for example, the wavelength of an optical signal is shifted to a shorter wavelength than $\lambda_1$, this signal is divided into a larger part output to the input monitoring channel waveguide S11 and a smaller part output to the input monitoring channel waveguide S12.

In contrast, if the wavelength of an optical signal is shifted to a longer wavelength than $\lambda_1$, this signal is divided into a smaller part output to the input monitoring channel waveguide S11 and a larger part output to the input monitoring channel waveguide S12.

In this manner, how much the wavelength of an optical signal has shifted relative to a predetermined value can be detected according to changes in the magnitudes of optical signals output to the input monitoring channel waveguides S11 and S12.

Accordingly, the monitoring channel waveguides are arranged so that the center wavelengths of the wavelength bands obtained by synthesizing the optical transmission wavelength characteristics of each pair among the plural pairs of input monitoring channel waveguides (S11, S12), (S21, S22), . . . , (Sn1, Sn2) become equal to the center wavelengths $\lambda_1, \lambda_2, \ldots, \lambda_n$ of the optical transmission wavelength band of each transmission channel waveguide, that is, the wavelengths become equal to wavelengths as references corresponding to each of the plurality of transmitted optical signals.

FIG. 2C shows the synthesized optical transmission wavelength characteristics between the group of pairs of input monitoring channel waveguides (S1, S12), (S21, S22), . . . , (Sn1, Sn2) and the output monitoring channel waveguide S0, which are arranged so as to establish the above positional relationship.

In this case, if a signal obtained by multiplexing the wavelengths $\lambda_1, \lambda_2, \ldots, \lambda_n$ is input to the output monitoring channel waveguide S0, each of optical signals of the above wavelengths is demultiplexed, and then is output to the respective pairs of input monitoring channel waveguides. Further, each of the wavelengths $\lambda_1, \lambda_2, \ldots, \lambda_n$ is located at the center of the optical transmission wavelength characteristic of each pair of input monitoring channel waveguides.

For example, an optical signal of the wavelength $\lambda_2$ obtained from the output monitoring channel waveguide S0 is demultiplexed and then is output to the pair of input monitoring channel waveguides (S21, S22). In this case, the wavelength $\lambda_2$ is located at the center of the optical transmission wavelength characteristics of the pair of input monitoring channel waveguides (S21, S22).

If the transmission channel waveguides 40 and 50 and the monitoring channel waveguides 60 and 70 are arranged so as to establish the above relationship, the interval between centers of the input transmission channel waveguides 40 (T1, T2, . . . , Tn) generally equals the distance determined based on the relationship between the wavelength and parameters for the optical multiplexing circuit 1. Further, this distance equals the mutual interval between the centers of each pair of corresponding input monitoring channel waveguides ((S11, S12), (S21, S22), . . . , or (Sn1, Sn2)).

However, the centers of the input transmission channel waveguides 40 and the centers of pair of the input monitoring channel waveguides 60 need not be arranged at predetermined intervals. It is important to maintain predetermined distances between the transmission channel waveguides 40 as well as between the monitoring channel waveguides 60.

In the description of FIG. 2, the optical transmission wavelength band of the monitoring channel waveguide is set narrower than that of the transmission channel waveguide. This is applicable to the following description.
(Variation)

A variation of the optical multiplexing circuit 1 will be described with reference to FIG. 3.

Figure 3A:
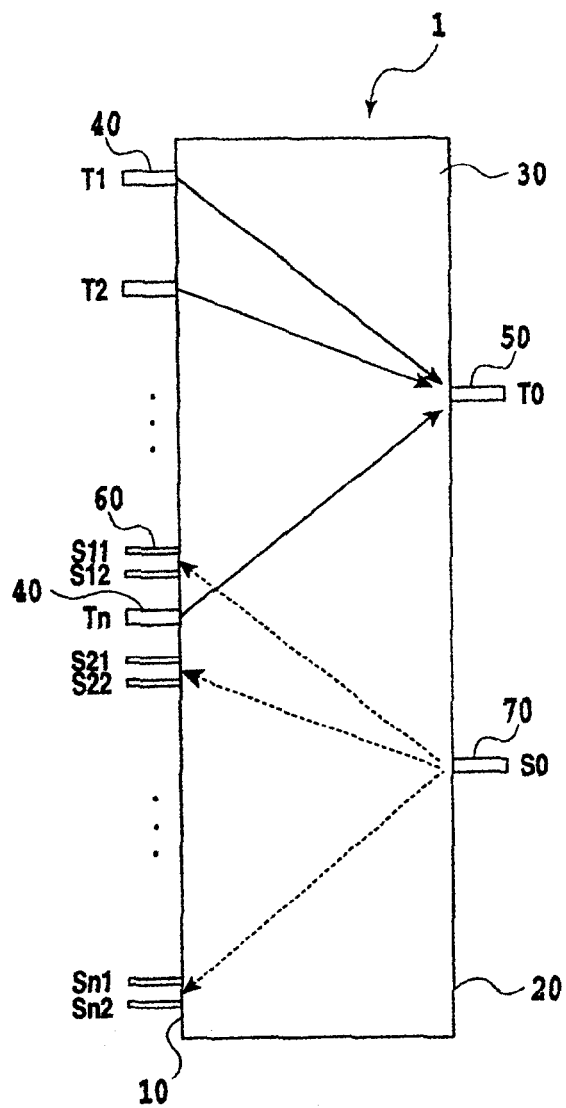
FIGS. 3A and 3B are block diagrams showing a variation of the optical multiplexing circuit in FIG. 1.
Figure 3B:
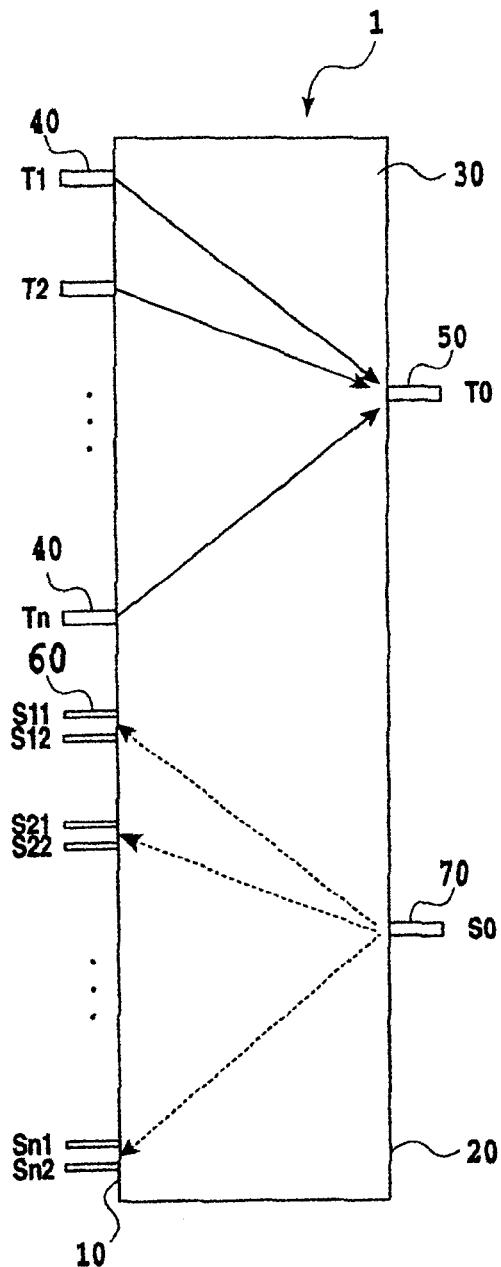

The transmission channel waveguides 40 and the monitoring channel waveguides 60 need not be completely alternately arranged together, but as shown in FIG. 3A, may be arranged so that the transmission channel waveguides 40 or the monitoring channel waveguides 60 channel waveguides sandwich the monitoring channel waveguide 60 or the transmission channel waveguide 40, respectively. Alternatively, as shown in FIG. 3B, the transmission channel waveguides 40 and the monitoring channel waveguides 60 may be arranged so as not to sandwich each other.

In the above description, it is assumed that the optical transmission wavelength characteristics of each pair of input monitoring channel waveguides 60 have the same shape and that the optical signal is divided into two equal channels at the center wavelength of the pair.

However, in general, the optical transmission wavelength characteristics of these channels do not always have perfectly the same shape due to manufacture deviations. In such a case, as described later, the optical transmission wavelength characteristics of both monitoring channel waveguides 60 of the pair can be measured, stored in an external circuit, and then corrected. Consequently, the optical transmission wavelengths of each pair of monitoring channel waveguides 60 need not have perfectly the same shape.

Here, an explanation will be given of the reason why the following expression has been used: "the optical transmission wavelength band of the output monitoring channel waveguide 70 is nearly equal to that of the transmission channel waveguide 40" or "the optical transmission wavelength band of the input monitoring channel waveguide 60 is about half of that of the transmission channel waveguide 40".

The optical transmission wavelength band of each channel waveguide is commonly set wide enough to accommodate a band required to transmit an optical signal. Accordingly, the optical transmission wavelength band of each channel waveguide commonly has a margin, and normally need not be precisely "equal" to or "half" of that of the corresponding channel waveguide. These points are applicable to the examples described below.
(Structures of the Input/Output Slab Waveguides)

Now, the structures of the facet portions of the input slab waveguide 102 and output slab waveguide 104 will be described with reference to FIGS. 4 to 6.

Figure 4:
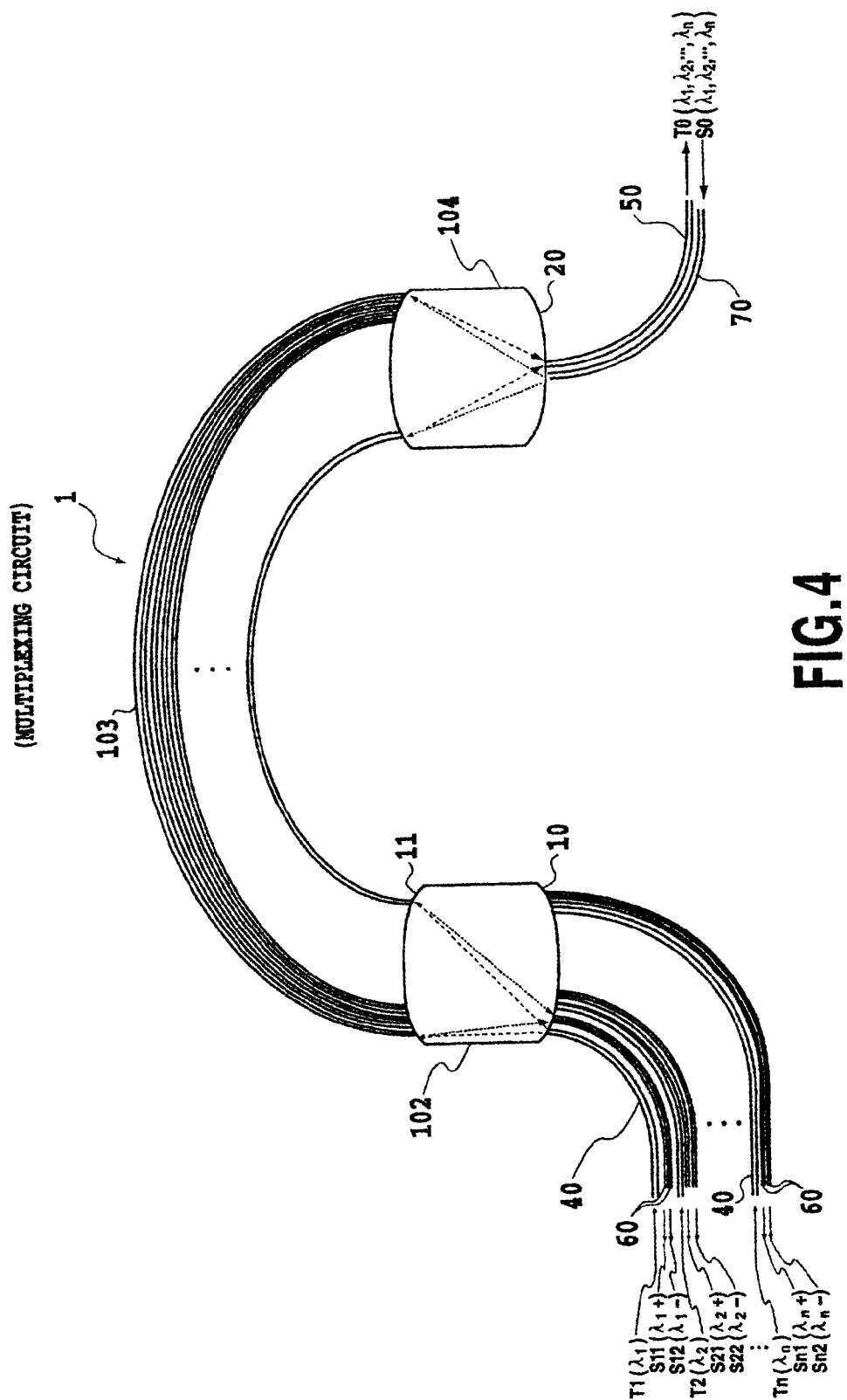
FIG. 4 is a block diagram showing an internal configuration of the multiplexing circuit.

FIG. 4 shows the internal configuration of the multiplexing circuit 1 in FIG. 1. This configuration will be described below in detail with reference to FIGS. 5 and 6.

Figure 5:
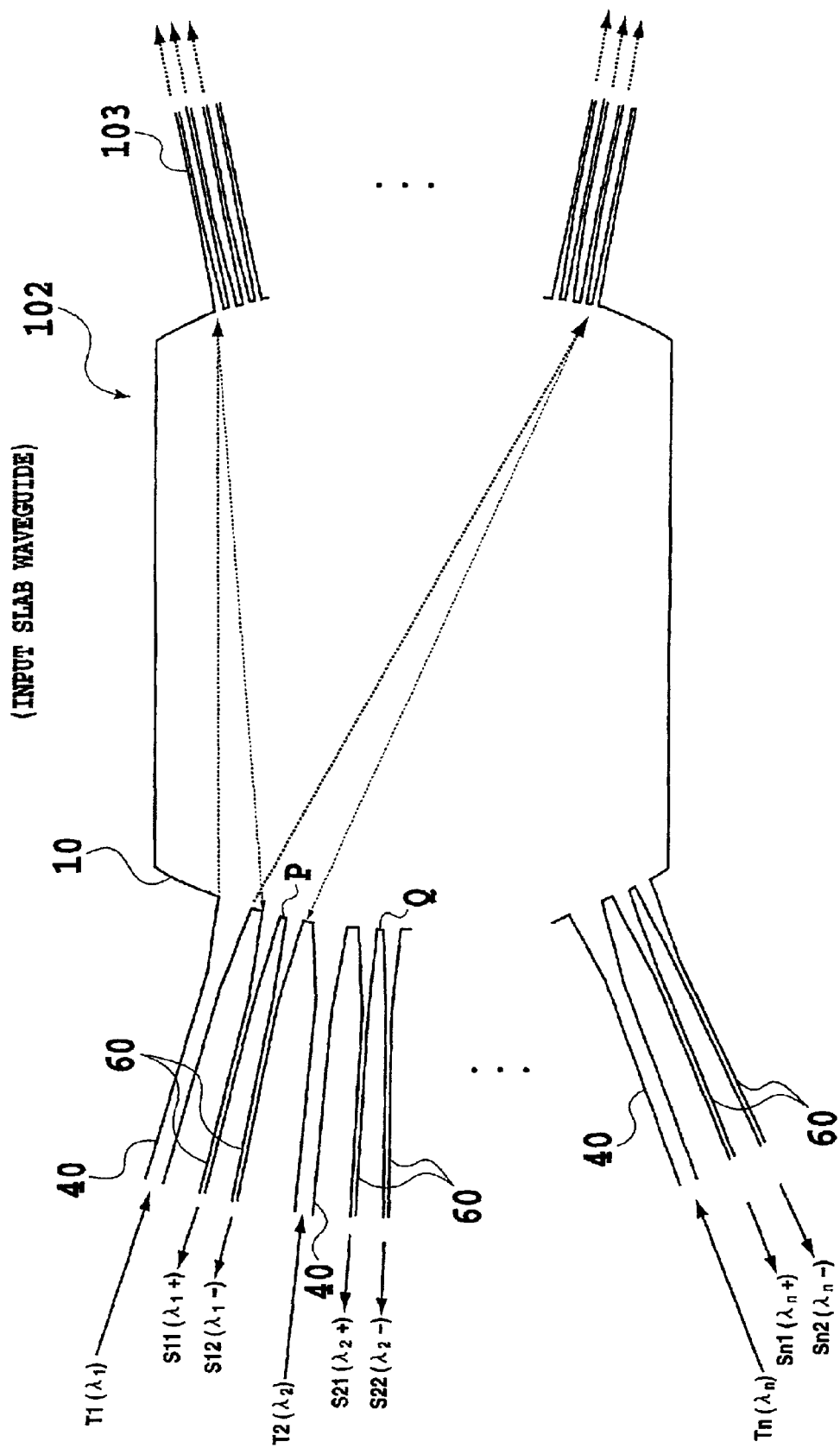
FIG. 5 is an enlarged view showing a configuration of a facet portion of an input slab waveguide.

FIG. 5 shows the structure of the facet portion of the input slab waveguide 102.

At the input facet 10 (first facet) of the input slab waveguide 102, the input transmission channel waveguides 40 of the group of input transmission channel waveguides T1, T2, . . . , Tn are arranged at predetermined intervals.

The predetermined intervals are determined on a well-known design method depending on the wavelengths of transmitted optical signals, the distance between the facet 10 of the slab waveguide 102 and the opposite facet 11 (at which the arrayed waveguide is arranged), and the like. The expression "predetermined intervals" will have a similar meaning in the following description.

In the group of pairs of input monitoring channel waveguides ((S11, S12), (S21, S22), , (Sn1, Sn2)), each pair of input transmission channel waveguides are arranged so that the center position of each pair is arranged at predetermined interval.

For example, this interval is set between the center position (that is, a branch root P) among the pair of input monitoring channel waveguides (S11, S12) and the center position (that is, a branch root Q) among the pair of input monitoring channel waveguides (S21, S22).

Further, FIG. 5 shows the waveguide width of the input monitoring channel waveguides 60 constituting each pair of input monitoring channel waveguides is set narrower than that of the input transmission channel waveguide 40. In this manner, the waveguide width of the input monitoring channel waveguides 60 may be set substantially half of that of the input transmission channel waveguide 40. Furthermore, the waveguide width of the input monitoring channel waveguides 60 is set narrower than that of the input transmission channel waveguide 40, downsizing the optical multiplexing circuit.

Figure 6:
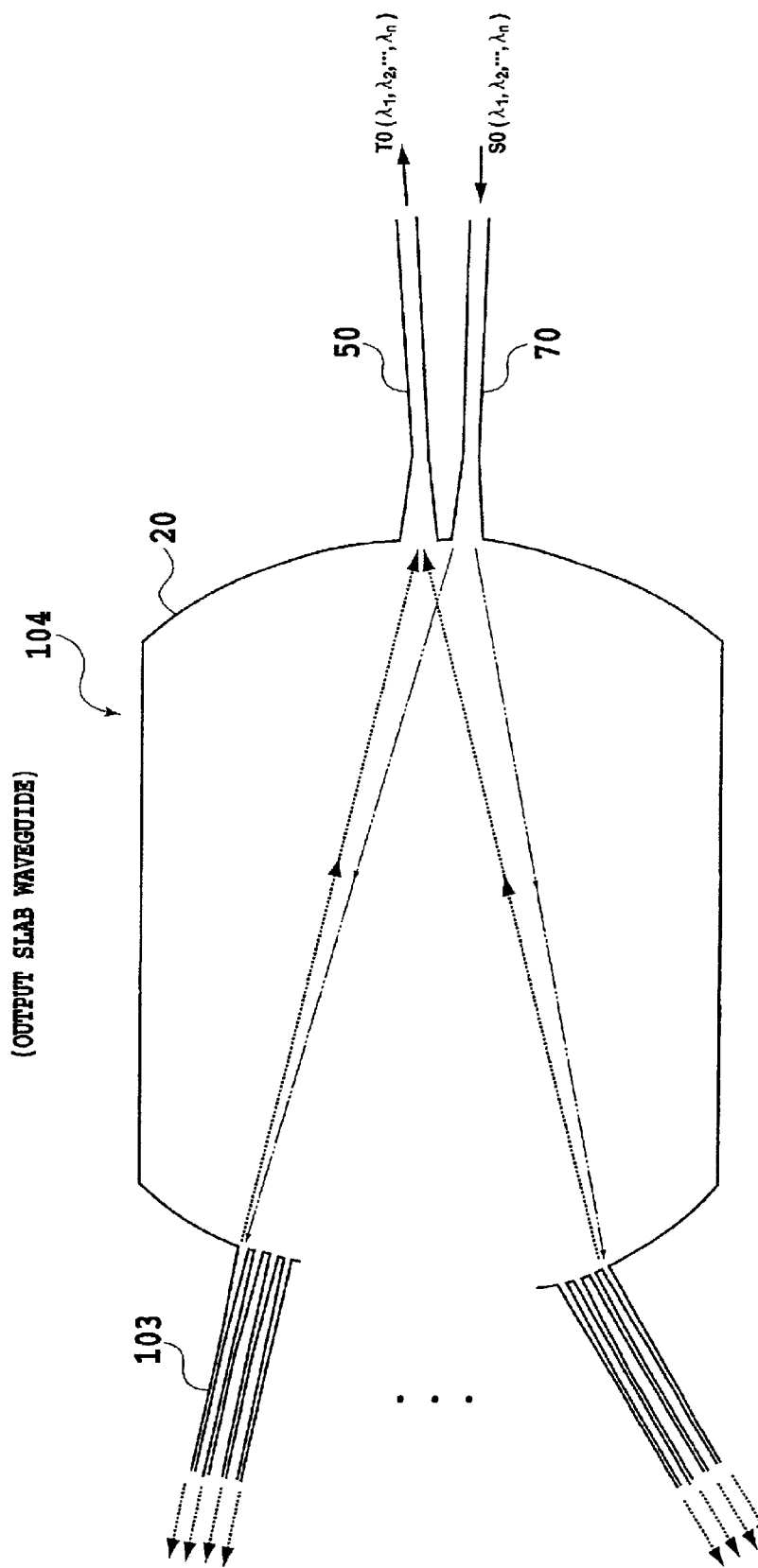
FIG. 6 is an enlarged view showing a configuration of a facet portion of an output slab waveguide.

FIG. 6 shows the structure of the facet portion of the output slab waveguide 104.

At the output facet 20 (fourth facet) of the output slab waveguide 104, the output transmission channel waveguide 50 (T0) is located relative to the corresponding input transmission channel waveguides 40 arranged at the input facet 10 (first facet) of the input slab waveguide 102.

This relative positional relationship is such that the output transmission channel waveguide 50 (T0) is arranged at such a position that it can multiplex a plurality of optical signals of different wavelengths transmitted from the group of input transmission channel waveguides T1, T2, . . . , Tn to generate a multiplexed beam (wavelengths $\lambda_1, \lambda_2, \ldots, \lambda_n$).

Further, the output monitoring channel waveguide 70 (S0) is located relative to each pair of input monitoring channel waveguides 60 arranged at the facet 10 (first facet) of the input slab waveguide 102.

This relative positional relationship is such that the output monitoring channel waveguide 70 (S0) is arranged at such a position that it can generate demultiplexed signals guided to each pair of input monitoring channel waveguides 60.

That is, when a multiplexed beam (wavelengths $\lambda_1, \lambda_2, \ldots, \lambda_n$) is output from the output monitoring channel waveguide 70 (S0), an optical signal of the wavelength $\lambda_1$ is guided to the pair of input monitoring channel waveguides (S11, S12). At this time, an optical signal of a wavelength $\lambda_1+$ is input to the input monitoring channel waveguide S1, while an optical signal of a wavelength $\lambda_1-$ is input to the input monitoring channel waveguide S12.

In the following description, the wavelength $\lambda_1+$ represents an optical signal component having a wavelength longer or shorter than the wavelength $\lambda_1$, whereas the wavelength $\lambda_1-$ represents an optical signal component having a wavelength shorter or longer than the wavelength $\lambda_1$. The symbols + and − are used simply to make the description more understandable and has no physical meanings.

(Wavelength Control Circuit)

Now, the wavelength control circuit 200 will be described with reference to FIGS. 7 to 9.

FIG. 7 shows an example of the configuration of the wavelength control circuit 200.

The wavelength control circuit 200 is composed of the areas other than the optical multiplexing circuit 1 described previously. This circuit will be described below in detail.

Reference numeral 210 denotes an optical branching circuit (C0).

Reference numeral 215 denotes an optical waveguide (C01) that outputs a main signal (wavelength multiplexed signal).

Reference numeral 220 denotes an optical waveguide (C02) that connects the optical branching circuit C0 extracting a part of the main signal, to the output monitoring channel waveguide S0.

Reference numeral 230 denotes a control signal extracting circuits (C1, C2, . . . , Cn) that output control signals for controlling wavelengths from electrooptic conversion circuits L1, L2, . . . , Ln to predetermined values.

Reference numeral 235 denotes a signal lines that connect the control signal extracting circuits (C1, C2, . . . , Cn) and the electrooptic conversion circuits (L1, L2, . . . , Ln) together.

Reference numeral 240 denotes the electrooptic conversion circuits (L1, L2, . . . , Ln) each composed of laser diodes and drive and control circuits therefor.

Reference numeral 250 denotes input terminals (I1, I2, . . . , In) for n channels electric signals to be transmitted.

Next, operations of the wavelength control circuit 200 will be described.

The optical branching circuit C0 receives an output from the output transmission channel waveguide T0 of the optical multiplexing circuit 1 as an input, and outputs most of this input to the main-signal-side optical waveguide C01, while outputting a part of this main signal, normally about 10% thereof, to the optical waveguide C02.

Figure 8:
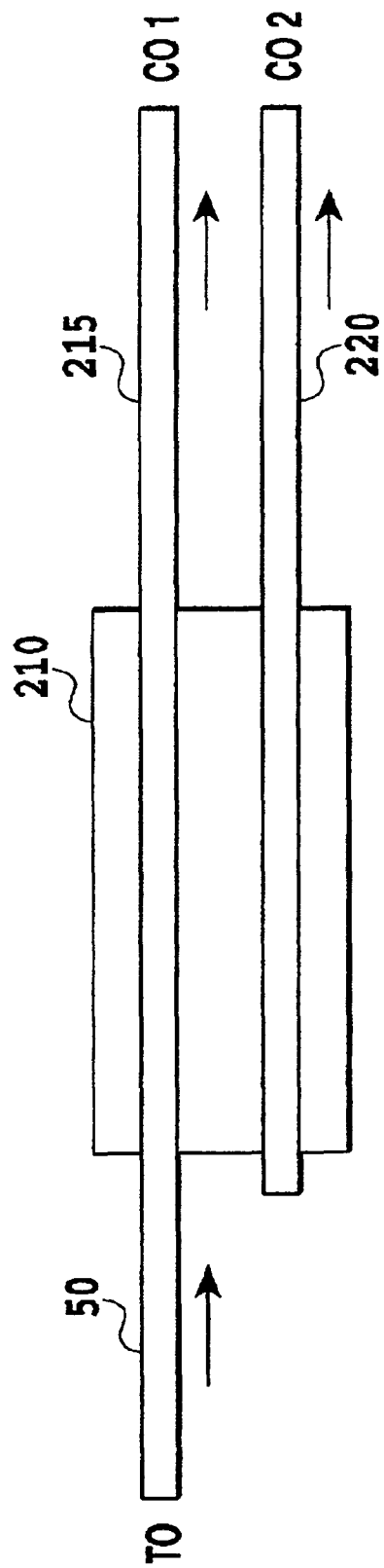
FIG. 8 is a block diagram showing a configuration of an optical branching circuit.

In this case, as shown in FIG. 8, the optical waveguide C01 and the optical waveguide C02 are arranged in proximity inside the optical branching circuit C0. Here, an optical signal (multiplexed signal) input from the output transmission channel waveguide 50 (T0) is branched and output to the output-terminal-side optical waveguides C01 and C02. This optical branching ratio can be varied depending on the degree of coupling between the optical waveguides C01 and C02.

Then, the thus branched and output optical signal is input to the output monitoring channel waveguide S0 of the optical multiplexing circuit 1 via the optical waveguide C02.

As shown by the broken line in FIG. 4 (FIG. 4 shows a signal of the wavelength $\lambda_1$), the optical signal input to the monitoring channel waveguide S0 of the output facet 20 travels to the opposite input facet 10 within the multiplexing area 30 and again is demultiplexed into different optical signals, which are then guided to the corresponding each pair of input monitoring channel waveguides ((S11, S12), (S21, S22), . . . , (Sn1, Sn2)).

(Optical Transmission Wavelength Characteristic)

Then, the optical transmission wavelength characteristic will be described.

FIGS. 9A to 9D are enlarged views useful in describing in detail the distribution of an optical signal between the pair of monitoring channel waveguides (S11, S12).

FIG. 9A shows the optical transmission wavelength characteristic between the input transmission channel waveguide T1 and the output transmission channel waveguide T0. This figure schematically shows that beams pass through the waveguides within a predetermined range around the wavelength $\lambda_1$ and gradually attenuate in the other wavelength areas.

FIG. 9B shows the optical transmission wavelength characteristics between the output monitoring channel waveguide S0 and the pair of input monitoring channel waveguides (S11, S12).

FIG. 9C shows the optical transmission wavelength characteristic between the output monitoring channel waveguide S0 and the input monitoring channel waveguide S11.

FIG. 9D shows the optical transmission wavelength characteristic between the output monitoring channel waveguide S0 and the input monitoring channel waveguide S12.

Here, as shown in FIG. 9B, if the wavelength of the optical signal equals the reference value $\lambda_1$, then the optical signal is divided into two equal areas because the waveguides S11 and S12 have an equal optical transmittance each other. Thus, optical signals corresponding to magnitudes shown by the arrows in FIGS. 9C and 9D are output to the input monitoring channel waveguides S11 and S12.

Then, for example, as shown in FIG. 9B, if the wavelength of the optical signal is shifted to $\lambda_1'$ of the long wavelength side, an optical transmittance of the waveguide S11 becomes smaller, while an optical transmittance of the waveguide S12 becomes larger. Accordingly, as shown by the arrows in FIG. 9C, the output to the waveguide S11 becomes smaller, whereas as shown by the arrows in FIG. 9D, the output to the waveguide S12 becomes larger.

Further, the reverse situation occurs when the wavelength of the optical signal is biased toward the short wavelength side.

Such changes in wavelength differentially change in the outputs from the pair of the input monitoring channel waveguides based on shifting the wavelength, the one output becomes larger, while the other output becomes smaller, that is, the output is changed differentially.

In the control signal extracting circuit C1, for example, a differential amplifying circuit or the like can convert a +voltage when the wavelength is biased toward the long wavelength side or a −voltage when wavelength is biased toward the short wavelength side into a control signal showing the shift of wavelength.

In this description, the optical transmission wavelength characteristics of each pair of input monitoring channel waveguides are assumed to have the same shape, but this assumption is not always true due to manufacture deviations or the like as described previously. In such a case, the optical transmission wavelength characteristics of both monitoring channel waveguides of the pair can be previously measured, the difference thereof can be measured, stored, and then corrected in the control signal extracting circuits C1, C2, . . . , Cn. Consequently, both channels of each pair of monitoring channel waveguides need not always have the same optical transmission wavelength characteristic. This condition is applicable to the arrangements in the following examples.

Then, the thus extracted control signal is supplied to a control end of the electrooptic conversion circuit L1 to maintain output optical wavelength at the reference value. The electrooptic conversion circuit is generally composed of laser diodes, and in such a case, the wavelength can be controlled using drive bias current or temperature.

As described above, the optical multiplexing circuit 1 of the present invention uses the demultiplexing function integrally formed therein to demultiplex a multiplexed signal again and then extract demultiplexed optical signals from the two differential output terminals. Consequently, it can be provided a control that the deviations of the wavelengths are detected and minimized.

This eliminates the need for the conventional structure in which the optical demultiplexing circuit is externally installed and in which the deviations of demultiplexed signals are detected by a filter or the like, and then the wavelength of an electrooptic conversion circuit, that is, laser diodes, is controlled based on the results of the detection, thus downsizing the circuit. Therefore, in particular, even if the wavelength multiplexing number increases to 16 or 32, burdens associated with implementation can be reduced, and costs can be significantly reduced.

(Integration)

In FIG. 7, the multiplexing area 30, the output transmission channel waveguide 50 (T0), the output monitoring channel waveguide 70 (S0), the optical branching circuit 210, and the optical waveguide 220 connecting between the optical branching circuit 210 and the output monitoring channel waveguide 70 can be integrated together in the same body. This provides a further compact configuration. This integration can be easily achieved using a well-known IC process technique.

SECOND EXAMPLE

A second embodiment of the present invention will be described with reference to FIGS. 10 to 16. The same parts as those in the first example, described previously, will not be described but are denoted by the same reference numerals.

(Outline)

An outline of the present invent ion will be provided.

Figure 10:
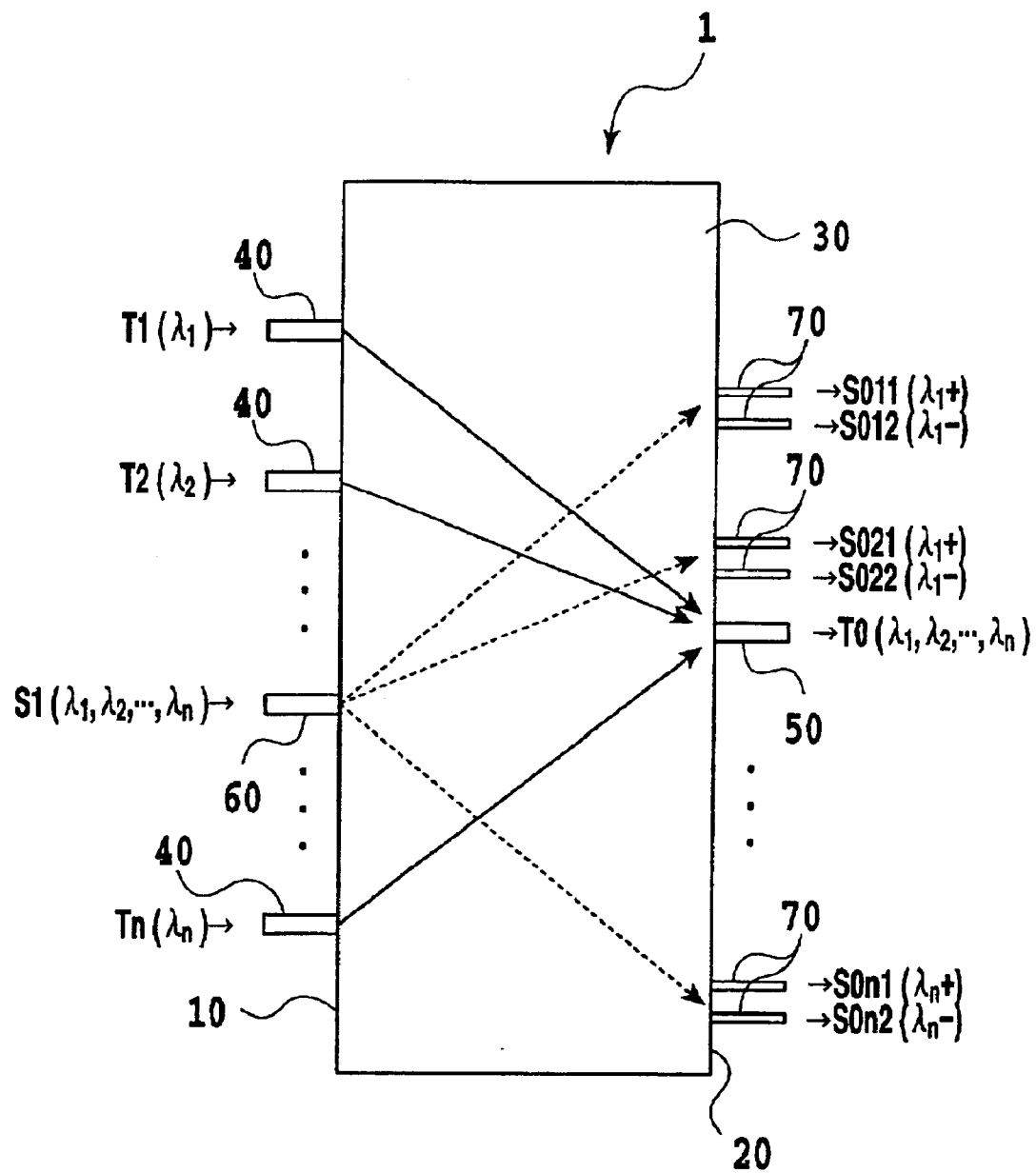
FIG. 10 is a block diagram showing a configuration of an optical multiplexing circuit as a second embodiment of the present invention.
Figure 15:
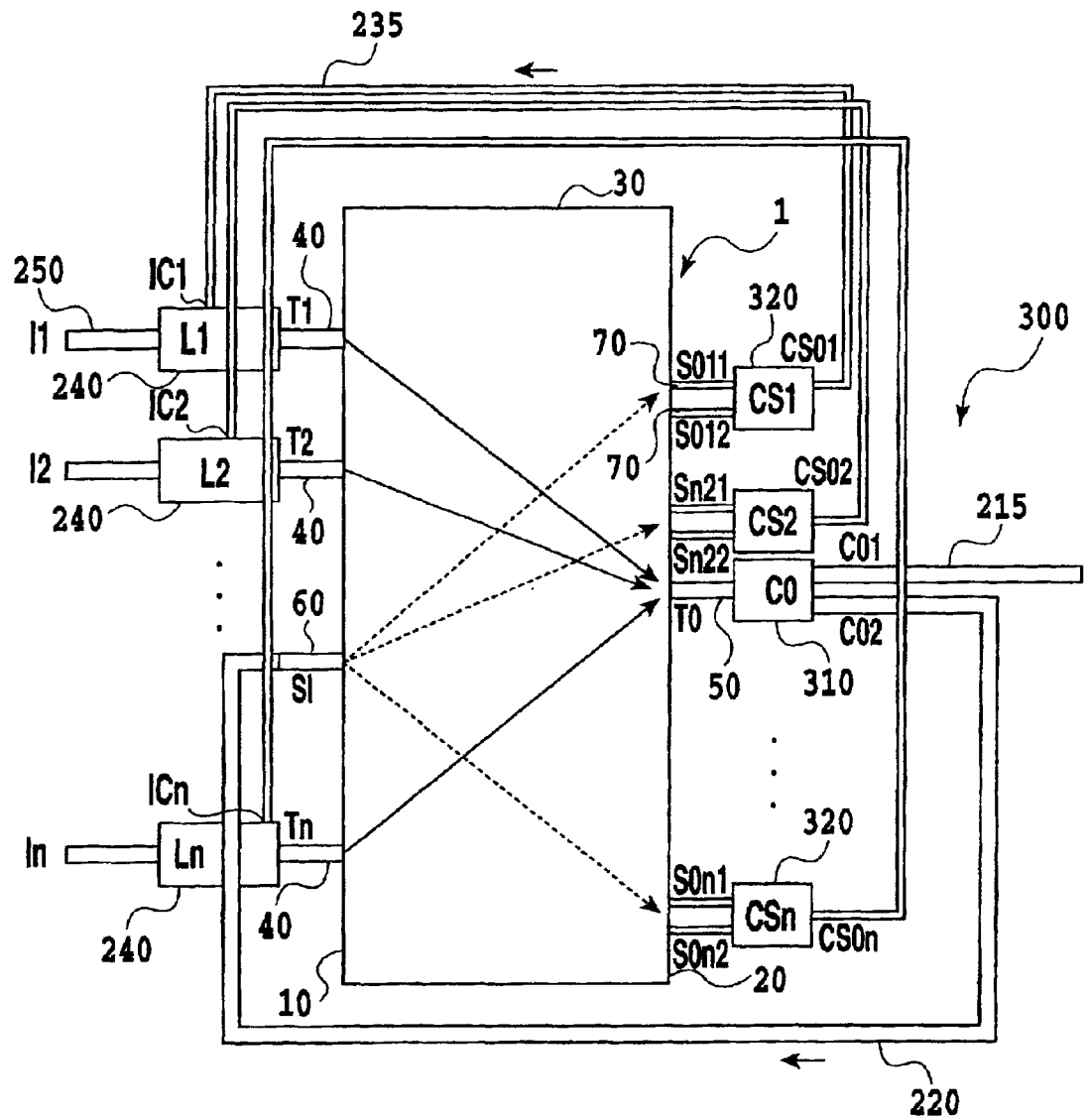
FIG. 15 is a block diagram showing a configuration of a wavelength control circuit.

In this example, as shown in FIGS. 10 and 15, described later, the components of an optical multiplexing circuit are constructed as follows.

Extracting means has a branching section 310 that branches a part of a wavelength multiplexed signal output from the output facet 20 to extract a check signal.

Check signal reintroducing means has third check terminal sections (220, 60) connected to the branching section (310), having a optical transmission wavelength bandwidth and characteristic equal to those of the transmission waveguide 50 transmitting a plurality of optical signals, and installed at the input facet 10.

Check signal detecting means has fourth check terminal sections (70) installed at the output facet 20 and having an optical transmission wavelength characteristic set so that, for example, bandwidth about half of the optical transmission wavelength bandwidth of the transmission waveguides 40 transmitting a plurality of optical signals are included and two overlapping mountains are formed, and the center wavelength of the wavelength bands of the two overlapping mountains substantially nearly equals a wavelength used as a reference corresponding to each of the plurality of transmitted optical signals.

With the above configuration, a wavelength multiplexed optical signal output from the output facet 20 of the multiplexing area 30 is branched by the branching section (310) to extract a check signal. The extracted check signal is introduced into the multiplexing area 30 from the third check terminal sections (220, 60) again and output from the fourth check terminal sections (70) as two check signals. On the basis of the two output check signals, a control signal is output.

A specific example will be described below.

SPECIFIC EXAMPLE

Now, a specific configuration of an optical multiplexer according to the present invention will be described with reference to FIGS. 10 to 16.

The optical multiplexer according to the present invention is roughly divided into the optical multiplexing circuit 1 including the multiplexing area 30, and a wavelength control circuit 300 having a function of monitoring and controlling the wavelength of an optical signal.

(Optical Multiplexing Circuit)

First, the optical multiplexing circuit 1 will be described with reference to FIGS. 10 and 11.

FIG. 10 shows the configuration of the optical multiplexing circuit 1.

(Input Facet)

At the input facet 10, the plurality of transmission channel waveguides 40 are arranged at predetermined intervals to constitute the group of input transmission channel waveguides T1, T2, . . . , Tn.

Further, one monitoring channel waveguide 60 (SI) having an optical transmission wavelength band nearly equal to that of the output transmission channel waveguide 50 is arranged, for example, at a predetermined position between the group of input transmission channel waveguides T1, T2, . . . , Tn.

In the multiplexing area 30, the input transmission channel waveguides 40 and the monitoring channel waveguides 60 are constructed as the input channel waveguides 101 of FIG. 25.

(Output Facet)

At the output facet 20, the output transmission channel waveguide 50 (T0) having an optical transmission wavelength band nearly equal to that of the input transmission channel waveguide 40 is arranged where a plurality of optical signals of different wavelengths ($\lambda_1, \lambda_2, \ldots, \lambda_n$) travelling from the group of input transmission channel waveguides T1, T2, . . . , Tn are multiplexed and are output.

Furthermore, the plurality of monitoring channel waveguides 70 constitute the group of output monitoring channel waveguides (S011, S012), (S021, S022), . . . , (S0n1, S0n2).

The group of output monitoring channel waveguides are arranged, such positions that when a multiplexed optical signal (wavelengths $\lambda_1, \lambda_2, \ldots, \lambda_n$) is input to the input monitoring channel waveguide SI, the multiplexed optical signal is demultiplexed, and then these demultiplexed signals are output according to the respective wavelengths.

In the multiplexing area 30, the output transmission channel waveguide 50 and the plurality of monitoring channel waveguides 70 are constructed as the output channel waveguides 105 of FIG. 25.

(Optical Transmission Wavelength Characteristic)

Here, optical transmission wavelength characteristic will be described.

In this example, in FIG. 10, the shapes of the waveguides in the multiplexing area 30 determine bands, such as, the pair of monitoring optical transmission wavelength bands between the input monitoring channel waveguides 60 and the pair of first and second output monitoring channel waveguides 70, and the transmission optical transmission wavelength band between the input transmission channel waveguides 40 and the output transmission channel waveguide 50. In this case, each of the monitoring optical transmission wavelength bands may be narrower than the transmission optical transmission wavelength band, and may be mutually equal each other.

The optical transmission wavelength characteristic will be described in further detail.

In each output monitoring channel waveguide 70, for example, an optical transmission wavelength band is smaller than that of the transmission channel waveguides 40 and 50. Also, the optical transmission wavelength characteristics of the pair of output monitoring channel waveguides (for example, (S011, S012)) form two mountains. Further, the wavelength band obtained by synthesizing the two optical transmission wavelength characteristics is nearly equal to that of the transmission channel waveguides 40 and 50. Then, the center wavelength of this wavelength band equals a wavelength used as a reference corresponding to each of the plurality of transmitted optical signals.

FIG. 11A shows the synthesized optical transmission wavelength characteristics between the group of input transmission channel waveguides T1, T2, ..., Tn and the output transmission channel waveguide T0.

This figure indicates that optical signals, each having a wavelength near the wavelength $\lambda_1, \lambda_2, \ldots, \lambda_n$, input from the waveguides T1, T2, ..., Tn are multiplexed and output, and no output is obtained when the wavelength of each optical signal deviates significantly from the wavelength $\lambda_1, \lambda_2, \ldots, \lambda_n$.

FIG. 11B shows the optical transmission wavelength characteristics between the input monitoring channel waveguide SI and the pair of output monitoring channel waveguides (S011, S012).

When the wavelength of the optical signal equals the reference value $\lambda_1$, then both monitoring channel waveguides have an equal optical transmission wavelength characteristic, and the optical signal is divided into two equal signals, which are then output to the respective channels. When the wavelength is shifted from the reference value $\lambda_1$ to a longer wavelength side or a shorter wavelength side, as the optical transmittances of both monitoring channel waveguides are different, an optical output of any one of channels increases and an optical output of the other channel decreases.

FIG. 11C shows the synthesized optical transmission wavelength characteristics between the input and output monitoring channel waveguides.

In the optical multiplexing circuit 1 characterized as described above, when a plurality of optical signals of different wavelengths are input to the group of input transmission channel waveguides T1, T2, ..., Tn, then a multiplexed output is obtained from the output transmission channel waveguide T0.

By extracting a part of this multiplexed output and inputting this part to the input monitoring channel waveguide SI, a control signal indicative of the displacement of wavelength of each signal is obtained from the group of output monitoring channel waveguides (S011, S012), (S021, S022), ..., (S0n1, S0n2).

On the basis of this control signals, the electrooptic conversion circuits L1, L2, ..., Ln in FIG. 15, described later, can be controlled to control the output optical wavelength so as to become a predetermined value.

(Structures of the Input/Output Slab Waveguides)

Now, the structures of the facet portions of the input slab waveguide 102 and output slab waveguide 104 will be described with reference to FIGS. 12 to 14.

Figure 12:
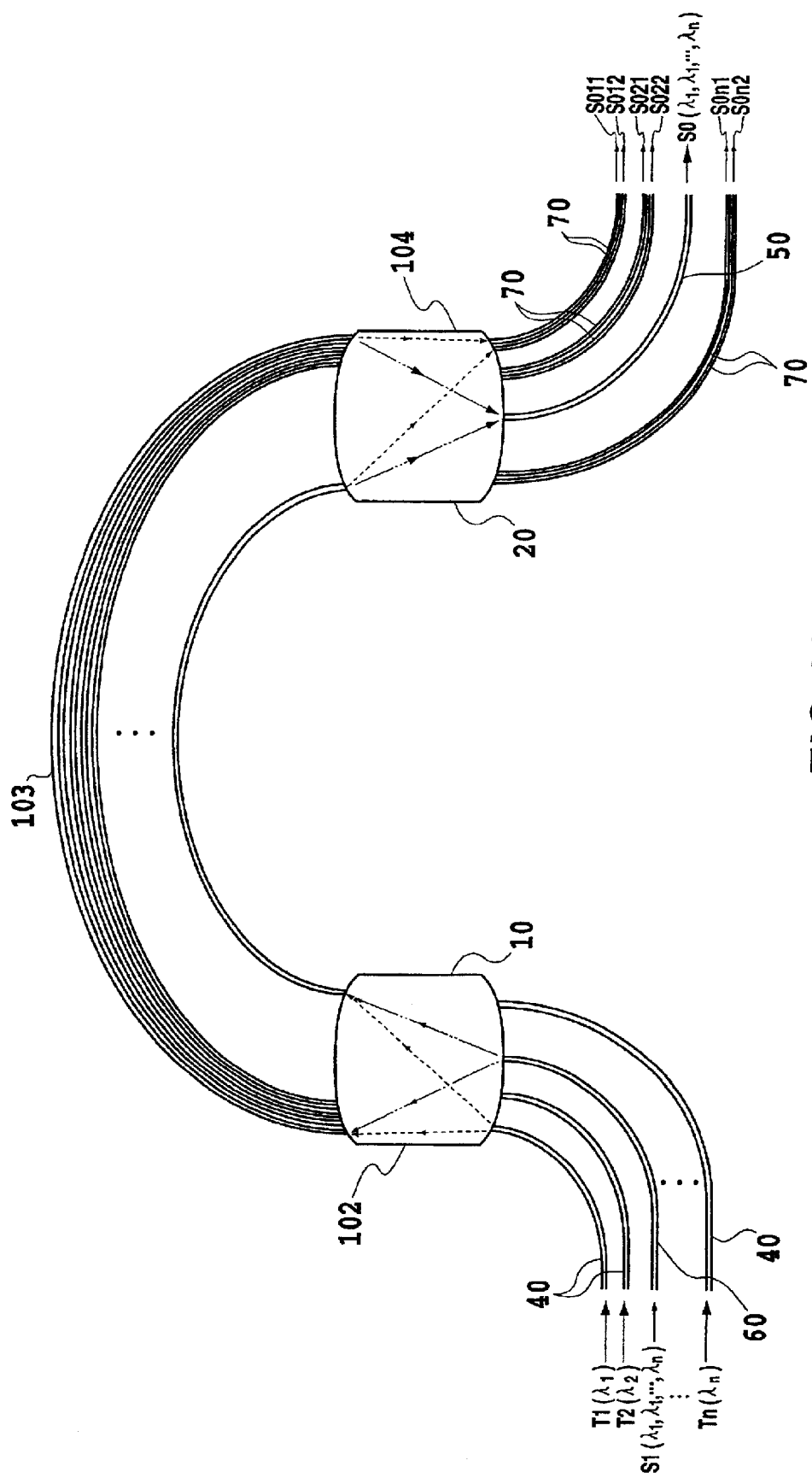
FIG. 12 is a block diagram showing the internal configuration of the multiplexing circuit.

FIG. 12 shows the internal configuration of the multiplexing circuit 1 in FIG. 1. The structures will be described below with reference to FIGS. 13 and 14.

Figure 13:
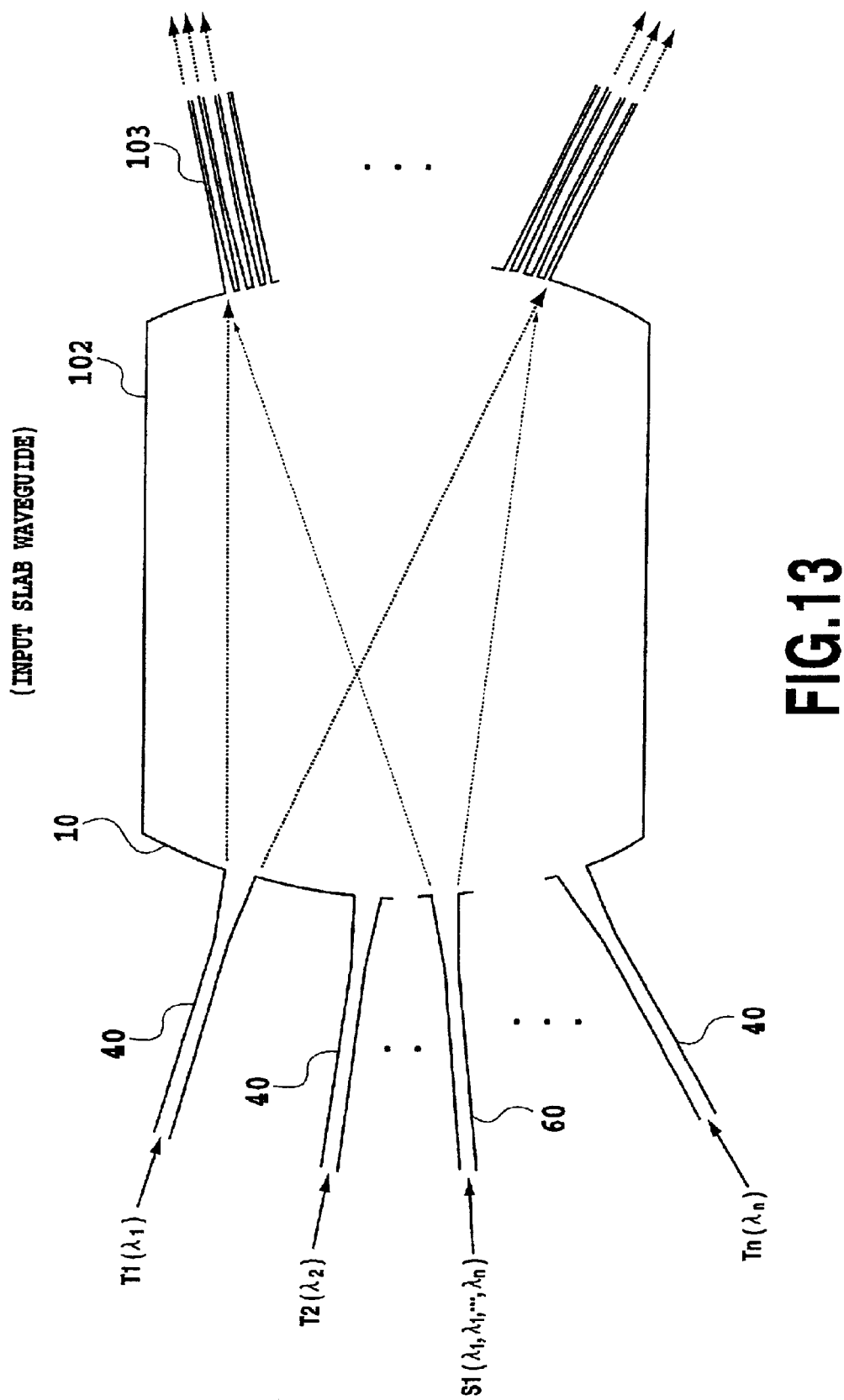
FIG. 13 is an enlarged view showing a configuration of a facet portion of an input slab waveguide.

FIG. 13 shows the structure of the facet of the input slab waveguide 102.

At the input facet 10 (first facet) of the input slab waveguide 102, the group of input transmission channel waveguides T1, T2, ..., Tn are arranged at predetermined intervals.

Further, the input transmission channel waveguide 60 is located relative to the corresponding pair of output transmission channel waveguides 70 arranged at the facet 20 (fourth facet) of the output slab waveguide 104.

This relative positional relationship is such that the input transmission channel waveguide 60 is arranged at such a position so as to generate demultiplexed beams guided to each pair of output monitoring channel waveguides 70.

That is, when a multiplexed beam (wavelengths $\lambda_1, \lambda_2, \ldots, \lambda_n$) is output from the input monitoring channel waveguide 60, an optical signal of the wavelengths is guided to the pair of output monitoring channel waveguides (S011, S012). At this time, an optical signal of the wavelength $\lambda_1+$ is input to the output monitoring channel waveguide S011, while an optical signal of the wavelength $\lambda_1-$ is input to the output monitoring channel waveguide S012.

Figure 14:
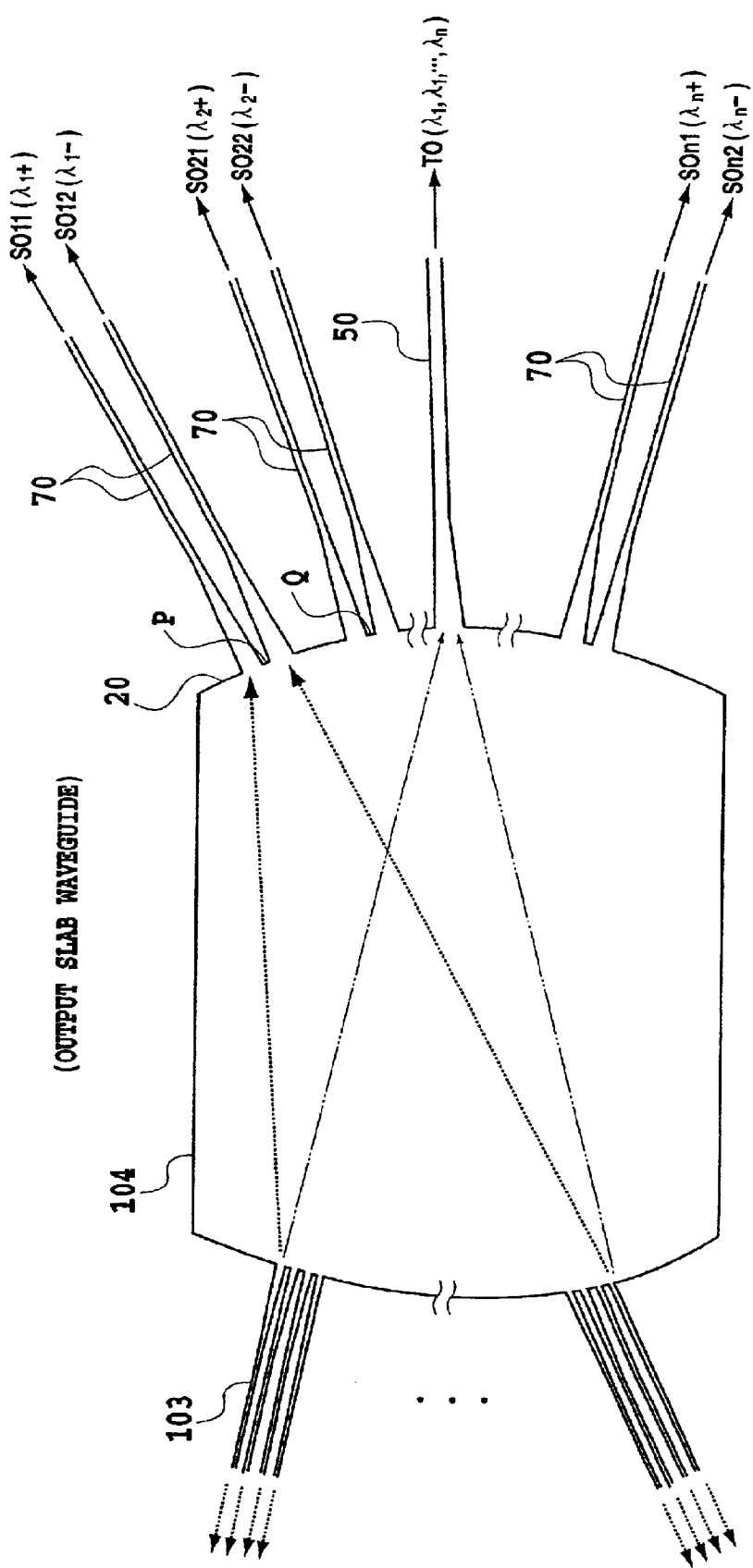
FIG. 14 is an enlarged view showing a configuration of a facet portion of an output slab waveguide.

FIG. 14 shows the structure of the facet of the output slab waveguide 104.

At the output facet 20 (fourth facet) of the output slab waveguide 104, each pair of output monitoring channel waveguides constituting the group of output monitoring channel waveguides ((S011, S012), (S021, S022), ..., (S0n1, S0n2)) is arranged so that the center positions of each pair is spaced at predetermined interval.

For example, the interval between the center position (that is, the branch root P) among the pair of output monitoring channel waveguides (S021, S012) and the center position (that is, the branch root Q) among the pair of output monitoring channel waveguides (S021, S022) is arranged so as to be a predetermined interval.

Further, in FIG. 14, for example, the waveguide width of the output monitoring channel waveguides 70 constituting each pair of output monitoring channel waveguides may be set narrower than that of the output transmission channel waveguide 50 (T0) or set equal to about half thereof. This figure shows that the waveguide width of the output monitoring channel waveguide 70 is set narrower than that of the output transmission channel waveguide 50 (T0), thus downsizing the size of the optical multiplexing circuit.

The output transmission channel waveguide 50 (T0) is located relative to the group of input transmission channel waveguides T1, T2, ..., Tn arranged at the input facet 10 (first facet) of the input slab waveguide 102.

This relative positional relationship is such that the output transmission channel waveguide 50 (T0) is arranged at such a position that a plurality of optical signals of different wavelengths transmitted from the group of input transmission channel waveguides T1, T2, ..., Tn are multiplexed to generate a multiplexed beam (wavelengths $\lambda_1, \lambda_2, \ldots, \lambda_n$).

In the above description, as shown in FIG. 10, the input monitoring channel waveguide 60 is arranged between the input transmission channel waveguides 40. However, it is necessary to maintain the relative positional relationships between the input transmission channel waveguides 40 and the output transmission channel waveguide 50 as well as between the input monitoring channel waveguide 60 and the output monitoring channel waveguides 70, and the mutual positional relationship between these two sets of channel waveguides can be changed. That is, in FIG. 10, with the relative positions maintained between the input monitoring channel waveguides 60 and the output monitoring channel waveguides 70, the input monitoring channel waveguides 60 may each be installed at such a position that is not sandwiched between the input transmission channel waveguides 40 (that is, the input monitoring channel waveguide 60 may be moved downward in FIG. 10). This situation is similar to FIG. 3, described previously in the first example.

(Wavelength Control Circuit)

Next, the wavelength control circuit 300 will be described with reference to FIGS. 15 and 16.

FIG. 15 shows an example of the wavelength control circuit 300.

Reference numeral 310 denotes an optical branching circuit (C0) that outputs a part, normally about 10%, of a multiplexed optical signal output to the output transmission channel waveguide T0, to the optical waveguide 220 (C02) for branch output, while outputting most of the signal to the optical waveguide C01 for outputting a main signal. This optical branching circuit 310 has the same configuration as that of the optical branching circuit 210 of the above described first example (see FIG. 8).

Reference numeral 320 denotes a control signal extracting circuit that detects a difference between optical signals from each pair of output monitoring channel waveguides 70 of the group of output monitoring channel waveguides (S011, S012), (S021, S022), ..., (S0n1, S0n2) and then outputs the result to a corresponding signal line CS01, CS02, ..., CS0n as an electric signal.

These signal lines CS01, CS02, ..., CS0n are connected to control terminals LC1, LC2, ..., LCn of the electrooptic conversion circuits L1, L2, ..., Ln.

The circuit also has the arrangements described below.

The input terminals I1, I2, ..., In for n electric signals to be transmitted and the electrooptic conversion circuits L1, L2, ..., Ln are structured as FIG. 7 of the first example, described previously.

As shown in FIG. 10, the optical multiplexing circuit 1 is structured by the input waveguides T1, T2, ..., Tn and SI as well as the output waveguides (S011, S012), (S021, S022), ..., (S0n1, S0n2) and T0.

Now, operations of the wavelength control circuit 300 will be described.

First, a plurality of electric signals to be transmitted are input to the electric signal input terminals I1, I2, ..., In, and then converted into optical signals of respective predetermined wavelengths $\lambda_1, \lambda_2, \ldots, \lambda_n$ in the electrooptic conversion circuit normally composed of laser diodes and a control circuit therefor. The optical signals obtained are then input to the input transmission channel waveguides T1, T2, ..., Tn of the optical multiplexing circuit 1, which are connected to the output terminals for these signals. These optical signals then travel through the optical multiplexing circuit 1, where they are multiplexed. The multiplexed optical signal is output to the output transmission channel waveguide T0.

Then, a part, normally about 10%, of the multiplexed optical signal is output to the branch output terminal C02 by the optical branching circuit C0, and then is input to the input monitoring channel waveguide SI. Then, the multiplexed optical signal is demultiplexed into optical signals of the wavelengths $\lambda_1, \lambda_2, \ldots, \lambda_n$ again, and then these demultiplexed signals are output to corresponding to the group of monitoring channel waveguides (S011, S012), (S021, S022), ..., (S0n1, S0n2).

FIGS. 16A to 16C show operations of each pair of output monitoring channel waveguides.

Here, the pair of output monitoring channel waveguides (S011, S012) will be described by way of example.

FIG. 16A shows the synthesized optical transmission wavelength characteristics between the input monitoring channel waveguide SI and the pair of output monitoring channel waveguides (S011, S012).

When the wavelength of a transmitted optical signal equals the reference value k the optical signal is divided in two signals, which are then uniformly output to the waveguides S011 and S012. However, if the wavelength is shifted to, for example, $\lambda_1'$, the waveguide S012 has a higher optical transmittance than the waveguide S011, so that smaller part of the optical signal is output to the waveguide S011, while a larger part thereof is output to the waveguide S012.

FIG. 16B shows a part of FIG. 16A by using arrows to indicate the magnitude of the corresponding signal. That is, this figure shows the optical transmission wavelength characteristic between the input monitoring channel waveguide SI and one output monitoring channel waveguide S011 of the pair of output monitoring channel waveguides (S011, S012).

FIG. 16C shows a part of FIG. 16A by using arrows to indicate the magnitude of the corresponding signal. That is, this figure shows the optical transmission wavelength characteristic between the input monitoring channel waveguide SI and the other output monitoring channel waveguide S012 of the pair of output monitoring channel waveguides (S011, S012).

Such a change in signal wavelength appears as a difference between outputs from both monitoring channel waveguides. The difference between the optical signals is converted into an electric signal that indicates how much the wavelength is biased toward the long or short wavelength side, by a differential amplifying circuit or the like of the control signal extracting circuit CS1, CS2, ..., CSn. These output are provided to the control terminal LC1, LC2, ..., LCn of the electrooptic conversion circuit through the output terminal CS01, CS02, ..., CS0n to control the output wavelength of the electrooptic conversion circuit to a predetermined value.

By this operation, an output from the output transmission channel waveguide T0 is controlled to the reference value, and then is extracted from the main signal output terminal C01 of the optical branching circuit C0 to another circuit.

In the above description, as shown in FIG. 16A, it is assumed in that the output monitoring channel waveguides S01 and S02 have an equal optical transmission wavelength characteristic each other, and that when the wavelength equals $\lambda_1$, the optical signal is divided into two signals of the same magnitude, which are then output to the waveguides S011 and S012. However, this condition is not always required as described previously.

(Integration)

In FIG. 15, the multiplexing area 30, the output transmission channel waveguide 50 (T0), and the optical branching circuit 310 (C0) may be integrated together in the same body. This configuration produces effects similar to those of the first example, described previously.

THIRD EXAMPLE

A third embodiment of the present invention will be described with reference to FIGS. 17 to 24. The same parts as those in the examples described previously will not be described but are denoted by the same reference numerals.

(Outline)

An outline of the present invention will be provided.

Figure 17:
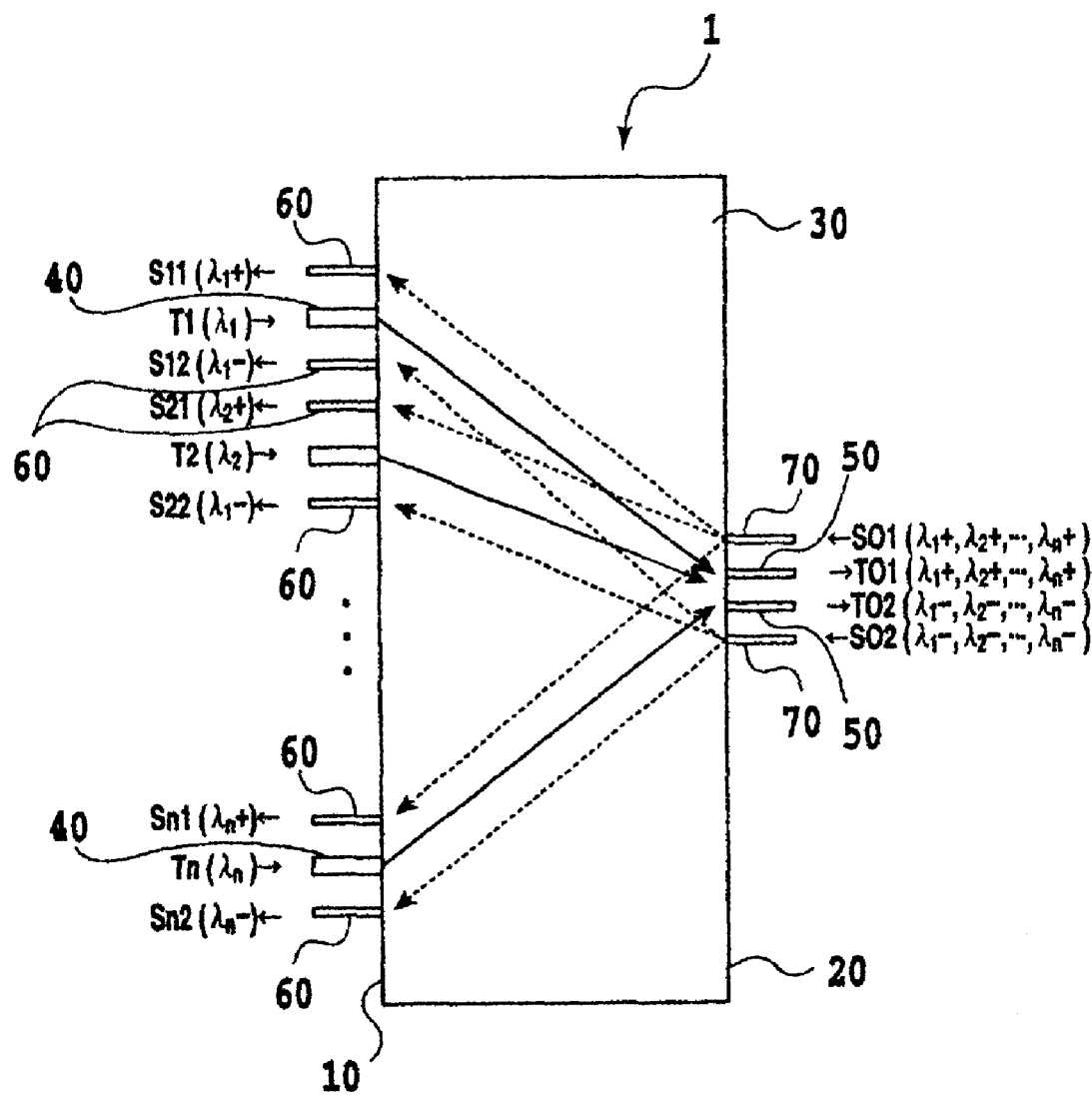
FIG. 17 is a block diagram showing a configuration of an optical multiplexing circuit as a third embodiment of the present invention.
Figure 22:
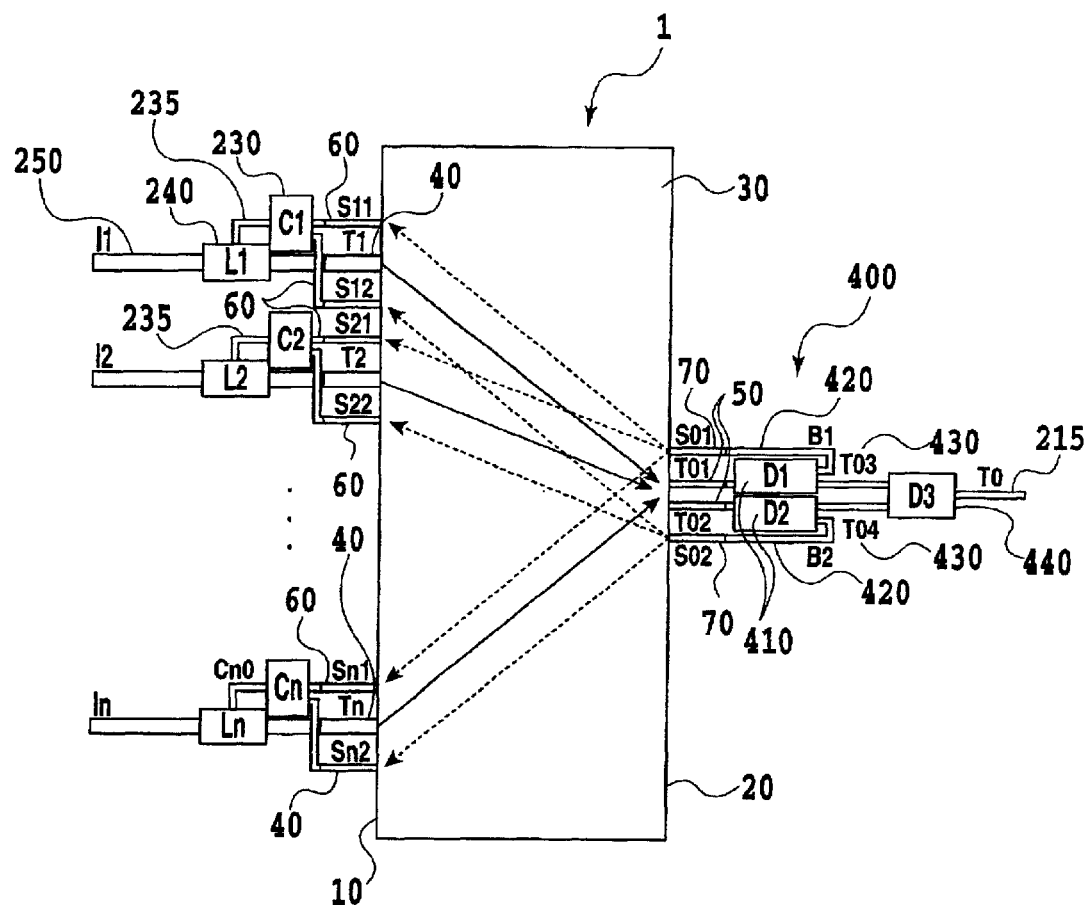
FIG. 22 is a block diagram showing a configuration of a wavelength control circuit.

In this example, as shown in FIGS. 17 and 22, described later, the components of an optical multiplexing circuit are constructed as follows.

Extracting means has fifth check terminal sections (that is, the transmission channel waveguides 50) installed at the output facet 20 of the multiplexing area 30 and having an optical transmission wavelength characteristic set, for example, so as to have a narrower bandwidth than optical transmission wavelength bandwidth of the transmission waveguides 40 transmitting a plurality of optical signals and to form two overlapping mountains in which the center wavelength of the wavelength bands of the two overlapping mountains substantially equals a wavelength used as a reference corresponding to each of the plurality of transmitted optical signals.

Furthermore, this extracting means is provided with a branching section (410) for branching a part of a wavelength division multiplexed optical signal outputted from the fifth check terminal sections (that is, the transmission channel waveguides 50) to provide a check signal.

Check signal reintroducing means further has sixth check terminal sections (420, 70) connected to the branching section (410), installed at the same facet 20 as that for the fifth check terminal section (that is, the transmission channel waveguides 50), and having a bandwidth and an optical transmission wavelength characteristic nearly equal to those of the fifth check terminal sections (50).

Check signal detecting means has seventh check terminal sections (60) installed at the input facet 10 and having a bandwidth and an optical transmission wavelength characteristic nearly equal to those of the fifth check terminal sections (that is, the transmission channel waveguides 50).

With the above configuration, a wavelength division multiplexed optical signal output from the fifth check terminal sections (that is, the transmission channel waveguides 50) that is structured as the output terminals of the multiplexing area 30, is branched by the branching section (410) to produce a check signal. The extracted check signal is introduced into the multiplexing area 30 again through the sixth check terminal sections (420, 70), and then is output from the seventh check terminal sections (60) as demultiplexed check signals with the respective wavelengths. On the basis of the output check signals, a control signal is output.

A specific example will be described below.

(Specific Example)

Now, a specific configuration of an optical multiplexer according to the present invention will be described with reference to FIGS. 17 to 24.

The optical multiplexer according to the present invention is roughly divided into between the optical multiplexing circuit 1 including the multiplexing area 30 and a wavelength control circuit 400 having a function of monitoring and controlling the wavelength of an optical signal.

(Optical Multiplexing Circuit)

First, the optical multiplexing circuit 1 will be described with reference to FIGS. 17 and 18.

FIG. 17 shows the array-waveguide grating type optical multiplexing circuit 1.

(Input Facet)

At the input facet 10, the plurality of transmission channel waveguides 40 are arranged at predetermined intervals to constitute the group of input transmission channel waveguides T1, T2, . . . , Tn.

Further, the pair of monitoring channel waveguides 60 are each arranged at the corresponding both sides of each transmission channel waveguide 40 to constitute the group of input monitoring channel waveguides (S11, S12), (S21, S22), . . . , (Sn1, Sn2).

In the multiplexing area 30, the input transmission channel waveguides 40 and the monitoring channel waveguides 60 are structured as the input channel waveguides 101 of FIG. 25.

(Output Facet) At the output facet 20, the set of transmission channel waveguides 50 are arranged to constitute the pair of output transmission channel waveguides (T01, T02).

The monitoring channel waveguides 70 are each arranged at the corresponding both sides of the transmission channel waveguides 50 to constitute the pair of output monitoring channel waveguides (S01, S02).

In the multiplexing area 30, the output transmission channel waveguides 50 and the monitoring channel waveguides 70 are structured as the output channel waveguides 105 of FIG. 25.

In the figure, the solid lines in the multiplexing area 30 conceptually show paths through which a plurality of optical signals of different wavelengths ($\lambda_1, \lambda_2, \ldots, \lambda_n$) input from the group of input transmission channel waveguides T1, T2, . . . , Tn travel to the pair of output transmission channel waveguides (T01, T02).

(Optical Transmission Wavelength Characteristic)

In this example, in FIG. 17, the optical transmission wavelength bands for transmission are substantially nearly equal to each other. Further, the optical transmission wavelength bands for monitoring are substantially nearly equal to the optical transmission wavelength bands for transmission.

The optical transmission wavelength characteristic will be described in further detail.

The pair of output transmission channel waveguides (T01, T02) are set to have such optical transmission wavelength characteristics as shown in FIG. 18A.

That is, the bandwidth of each of the optical transmission wavelength characteristics of the pair of output transmission channel waveguides (T01, T02) is, for example, about half of that of the optical transmission wavelength characteristic (center wavelength $\lambda_1$) of the input transmission channel waveguide T1. The optical transmission wavelength characteristics of the pair of output transmission channel waveguides (T01, T02) form two overlapping mountains. An optical transmission wavelength band, obtained by synthesizing the optical transmission wavelength characteristics of the pair of output transmission channel waveguides (T01, T02), is equal to that of the transmission channel waveguide T1, and the center wavelength of the synthesized optical transmission band is consistent with a wavelength used as a reference corresponding to each of the plurality of transmitted optical signals.

With these settings, when the wavelength of an optical signal input to the input transmission channel waveguide T1 is consistent with the reference wavelength $\lambda_1$, then an optical signal obtained by multiplexing in the multiplexing area 30 is divided into two signals, and then these two signals are output to the pair of transmission channel waveguides (T01, T02).

Further, similarly, optical signals of the wavelengths $\lambda_2, \ldots, \lambda_n$ from the input transmission channel waveguides T2, . . . , Tn are each divided into two signals, and then these two signals are output to the pair of output transmission channel waveguides (T01, T02).

In FIG. 17, the solid lines in the multiplexing area 30 schematically indicate how the signals are each divided into two signals, and are output to the pair of transmission channel waveguides (T01, T02) at the output side.

These divided and output pair of signals can be easily synthesized by using an optical coupling circuit 440 (D3) connected to the pair of output transmission channel waveguides (T01, T02), as described later.

Next, explanation will be given of the relationship between the optical transmission wavelength characteristics of the input monitoring channel waveguide 60 and output monitoring channel waveguide 70.

The optical transmission wavelength characteristics of the pair of output monitoring channel waveguides (S01, S02)

and pairs of input monitoring channel waveguides (S11, S12), (S21, S22), ..., (Sn1, Sn2) are each set to have a wavelength band nearly equal to that of the output transmission channel waveguides T01 and T02.

In this case, after processes of multiplexing and division into two, when the multiplexed and divided optical signals output to the output transmission channel waveguide T01 are input to one output monitoring channel waveguide S01 of the output monitoring channel waveguides (S01, S02), the signals are demultiplexed into signals of the respective wavelengths in the multiplexing area 30, and then the demultiplexed signals are output to the channel waveguides S11, S21, ..., Sn1.

FIG. 18B shows the optical transmission wavelength characteristics relationship between one S01 of the pair of output monitoring channel waveguides (S01, S02) and the input monitoring channel waveguides S11, S21, ..., Sn1 in the case of such setting.

Alternatively, after multiplexing and subsequent division into two, when the multiplexed and divided optical signals output to the output transmission channel waveguide T02 are input to the other S02 of the pair of the output monitoring channel waveguides (S01, S02), the signals are demultiplexed into signals of the respective wavelengths in the multiplexing area 30, and then the demultiplexed signals are output to the channel waveguides S12, S22, ..., Sn2.

FIG. 18C shows the optical transmission wavelength characteristics relationship between the other S02 of the pair of output monitoring channel waveguides (S01, S02) and the input monitoring channel waveguides S12, S22, ..., Sn2 in the case of such setting.

A general operation performed under these settings is as follows.

First, a plurality of optical signals of the wavelengths $\lambda_1$, $\lambda_2$, ..., $\lambda_n$ are input to the input transmission channel waveguides T1, T2, ..., Tn. These optical signals are multiplexed in the multiplexing area 30 and the signal obtained is output to the pair of output transmission channel waveguides (T01, T02).

In this case, if wavelengths of these optical signals are consistent with the wavelengths $\lambda_1$, $\lambda_2$, ..., $\lambda_n$, output signals are divided into two groups according to the output transmission channel waveguides (T01, T02), and then the divided signals are output.

As shown in FIG. 23A, the division into two means that when the optical transmission wavelength bands of the transmission channel waveguides T01 and T02 are overlapped each other at the centered wavelength $\lambda_1$, optical signals are branched and output to either the channel waveguide T01 or T02. That is, if a wavelength of an optical signal is the wavelength $\lambda_1$, so that the signal is divided into two signals because the channel waveguides T01 and T02 have an equal optical transmittance, and then these divided signals are output to the channel waveguides T01 and T02, respectively. In this case, if the wavelength of the optical signal is shifted to wavelength $\lambda_1'$, a larger part of the signal is output to the channel waveguide T02 because the channel waveguide T02 has a higher optical transmittance than the channel waveguide T01.

If the wavelength of any optical signal is shifted to the long or short wavelength side, a larger part of the signal is output to either one of the output transmission channel waveguides T01 and T02, while a smaller part thereof is output to the other.

In this case, when a part of the output from the output transmission channel waveguide T01 is input to the output monitoring channel waveguide S01, this part is demultiplexed into different signals again in the multiplexing area 30, and then the demultiplexed signals are output to the input monitoring channel waveguides (S11, S21, ..., Sn1).

On the other hand, when a part of the output from the output transmission channel waveguide T02 is input to the output monitoring channel waveguide S02, this part is demultiplexed into different signals again in the multiplexing area 30, and then the demultiplexed signals are output to the input monitoring channel waveguides (S12, S22, ..., Sn2).

In this case, concerning the input transmission channel waveguide T1, when outputs from the pair of input monitoring channel waveguides (S11, S12) are measured, determine how much the wavelength of the optical signal is shifted to the long or short wavelength side from the reference $\lambda_1$ can be determined. This is similar to the other transmission channel waveguides.

Thus, if the wavelengths of a plurality of optical signals have a deviation from the reference value, a signal is obtained notifying the corresponding monitoring channel waveguide of the deviation.

By using the arrayed-waveguide grating optical multiplexing circuit 1 having the above described functions, the wavelength control circuit 400 will be described that a plurality of optical signals are multiplexed, the deviation of each wavelength is detected, and the wavelength is controlled so as to obtain a predetermined value.

(Structures of the Input/Output Slab Waveguides)

Now, the structures of the facet portions of the input slab waveguide 102 and output slab waveguide 104 will be described with reference to FIGS. 19 to 21.

Figure 19:
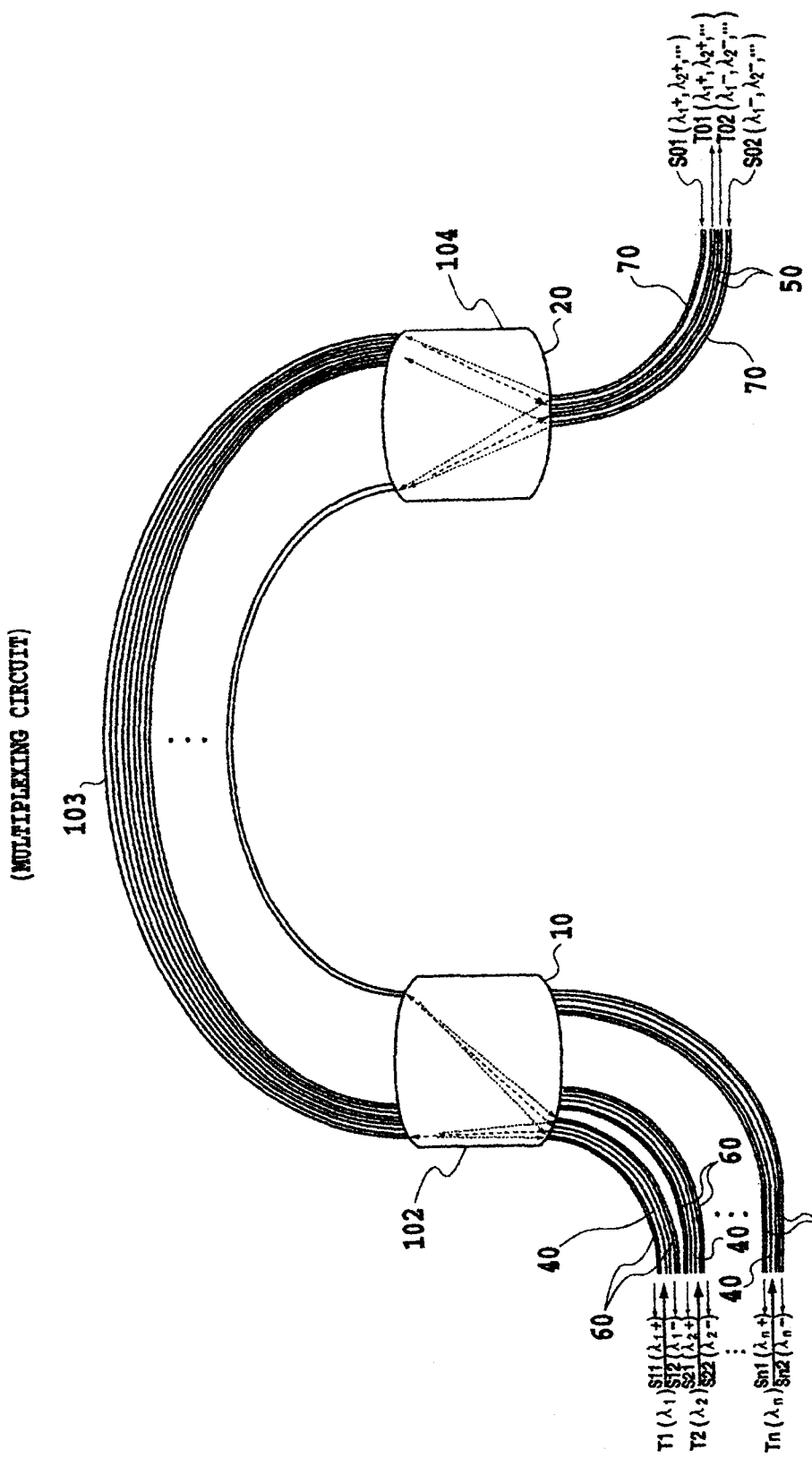
FIG. 19 is a block diagram showing an internal configuration of the multiplexing circuit.

FIG. 19 shows the internal structure of the multiplexing circuit 1 in FIG. 17.

Figure 20:
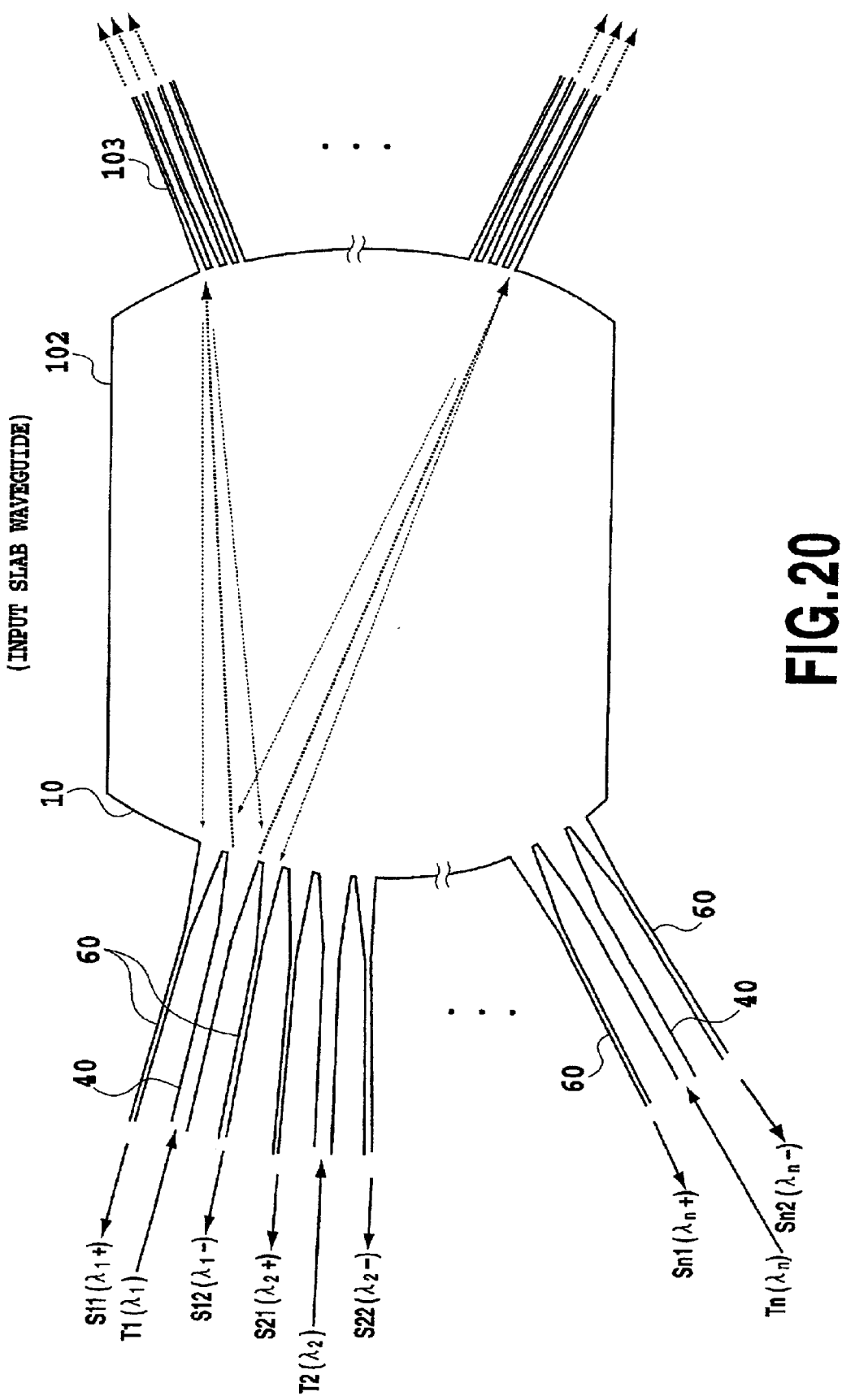
FIG. 20 is an enlarged view showing a configuration of a facet portion of an input slab waveguide.

FIG. 20 shows the structure of the facet portion of the input slab waveguide 102.

At the input facet 10 of the input slab waveguide 102, each of the group of input transmission channel waveguides T1, T2, ..., Tn is arranged at predetermined interval (for example, interval depending on the wavelength of transmitted optical signal).

Further, in the group of the pair of input monitoring channel waveguides ((S11, S12), (S21, S22), ..., (Sn1, Sn2)), each pair of input monitoring channel waveguides is arranged at predetermined interval by using one of each pair of the channel waveguides as a reference position.

If, for example, one S11 of the input monitoring channel waveguides (S11, S12) is set as a reference position, the input monitoring channel waveguides S21, S31, ..., Sn1 are arranged at predetermined intervals each other.

Furthermore, since the other input monitoring channel waveguide S12 may also be set as a reference position, the input monitoring channel waveguides S22, S32, ..., Sn2 are arranged at predetermined intervals each other.

Moreover, the waveguide width of each of the input monitoring channel waveguides 60 constituting the each pair of input monitoring channel waveguides, the waveguide width of each of the output monitoring channel waveguides 70 constituting each of output monitoring channel waveguides, and the waveguide width of each of the output transmission channel waveguides 50 constituting the output transmission channel waveguide may be set narrower than that of the input transmission channel waveguides 40 or set equal to about half thereof. Furthermore, for example, the waveguide width is set to about half, thus downsizing an optical multiplexing circuit.

Figure 21:
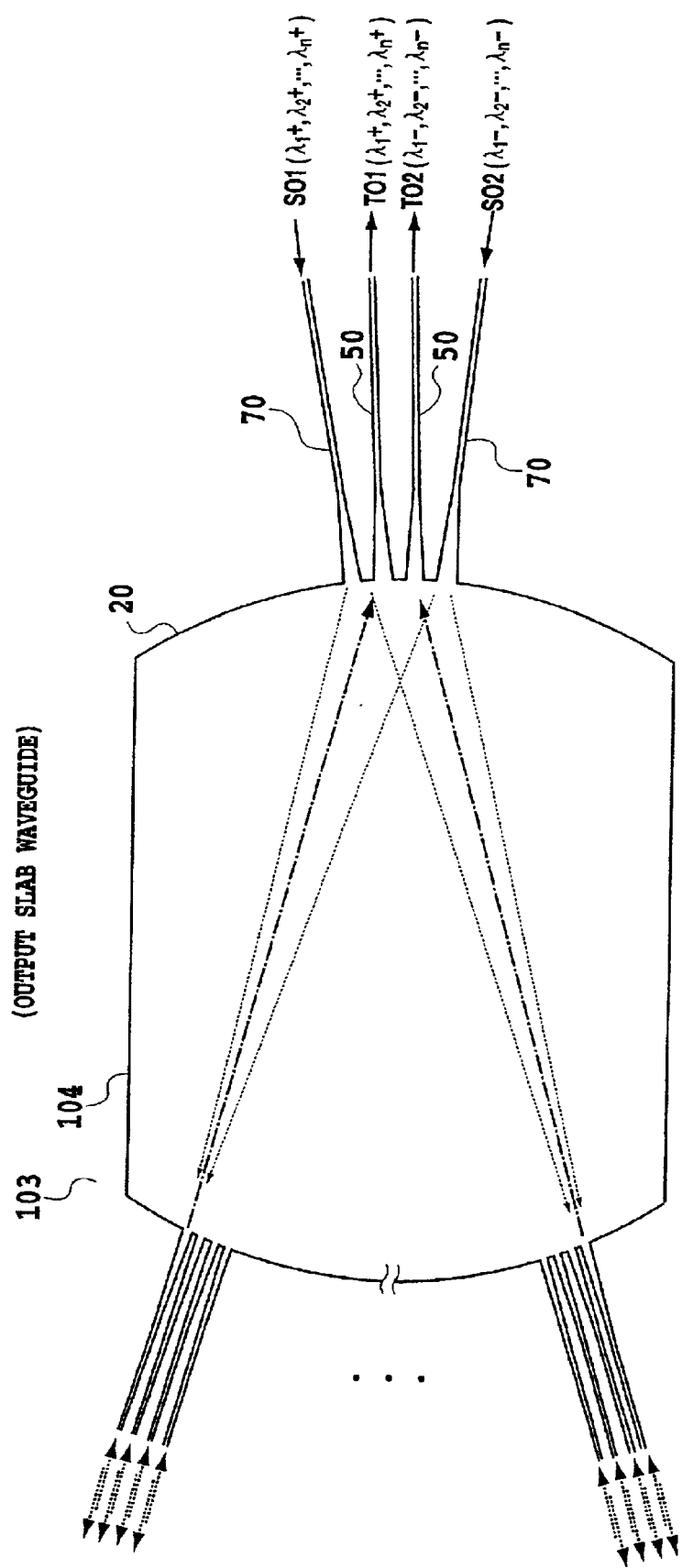
FIG. 21 is an enlarged view showing a configuration of a facet portion of an output slab waveguide.

FIG. 21 shows the structure of the facet portion of the output slab waveguide 104.

At the output facet 20 (fourth facet) of the output slab waveguide 104, the pair of output transmission channel waveguides 50 are located relative to the group of input transmission channel waveguides T1, T2, . . . , Tn arranged at the input facet 10 (first facet) of the input slab waveguide 102.

This relative positional relationship is such that the pair of output transmission channel waveguides 50 are arranged at such positions that a plurality of optical signals transmitted from the group of input transmission channel waveguides T1, T2, . . . , Tn are multiplexed to generate a multiplexed beam (wavelengths $\lambda_1, \lambda_2, \ldots, \lambda_n$).

Further, the pair of output monitoring channel waveguides 70 are located relative to each pair of input monitoring channel waveguides 60 arranged at the input facet 10 (first facet) of the input slab waveguide 102.

This relative positional relationship is such that the pair of output monitoring channel waveguides 70 are arranged at such positions that demultiplexed beams guided to each pair of input monitoring channel waveguides 60 are generated.

That is, when a multiplexed beam (wavelengths $\lambda_1+$, $\lambda_2+, \ldots, \lambda_n+$) is input from one S01 of the output monitoring channel waveguides, an optical signal of the wavelength $\lambda_1+$ is guided and is output to one S11 of the pair of input monitoring channel waveguides (S11, S12).

When a multiplexed beam (wavelengths $\lambda_1-, \lambda_2-, \ldots, \lambda_n-$) is input from the other output monitoring channel waveguide S02, an optical signal of the wavelength $\lambda_1-$ is guided and is output to the other S12 of the pair of input monitoring channel waveguides (S11, S12).

In the above description, as shown in FIG. 17, the input monitoring channel waveguides 60 are each set between the input transmission channel waveguides 40. However, it is necessary to maintain the relative positional relationships between the input transmission channel waveguides 40 and the output transmission channel waveguide 50, between one (S11, S21, . . . , Sn1) of the input monitoring channel waveguides 60 and one S01 of the output monitoring channel waveguides 70, and between the other (S12, S22, . . . , Sn2) of the input monitoring channel waveguides 60 and the other S02 of the output monitoring channel waveguides 70, and the mutual positional relationship between these three sets of channel waveguides can be changed.

That is, in FIG. 17, with the relative positions maintained between the input monitoring channel waveguides 60 and the output monitoring channel waveguides 70, the input monitoring channel waveguides 60 may each be installed at such a position so that the waveguides 60 is not sandwiched between the input transmission channel waveguides 40 (that is, the input monitoring channel waveguide 60 may be moved downward in FIG. 17). This situation is similar to FIG. 3, described previously in the first example.

(Wavelength Control Circuit)

Next, the wavelength control circuit 400 will be described with reference to FIGS. 22 and 24.

FIG. 22 shows an example of configuration of the wavelength control circuit 400 using the arrayed-waveguide grating type optical multiplexing circuit 1.

Reference numeral 410 denotes optical branching circuits (D1, D2) each having the same functions as the optical branching circuit 210 (see FIG. 8) in the first example, described previously. The optical branching circuits D1 and D2 are connected to the output transmission channel waveguides T01 and T02, respectively.

Reference numeral 420 denotes optical waveguides B1 and B2 connecting one side of each of the optical branching circuits D1 and D2 to the output monitoring channel waveguides S01 and S02, respectively. That is, the optical waveguide B1 connects the optical branching circuit D1 to the monitoring channel waveguide S01. The optical waveguide B2 connects the optical branching circuit D2 to the monitoring channel waveguide S02.

Reference numeral 430 denotes optical waveguides T03 and T04 connecting the other side of each of the optical branching circuits D1 and D2 to a synthesis circuit D3.

Reference numeral 440 denotes the synthesis circuit D3 (optical coupling circuit) that couples two branched signals together to generate a main signal. The synthesis circuit D3 synthesizes optical signals from the optical waveguides T03 and T04 and outputs the synthesized signal to the exterior through the optical waveguide T0.

The synthesis circuit D3 can synthesize two branched signals together by reversely using the input and output of the optical branching circuit D1 or D2.

The optical branching circuits D1 and D2 each branches a part, normally about 10%, of a multiplexed optical signal input from the output transmission channel waveguide T01 or T02, respectively, and outputs this part to a branch output terminal B1 or B2, respectively. Further, the remaining most, normally about 90%, of the optical signal is output to the optical T03 or T04, respectively.

This circuit also has the arrangements described below.

The input transmission channel waveguides T1, T2, Tn, the input monitoring channel waveguides (S11, S12), (S21, S22), . . . , (Sn1, Sn2), the output transmission channel waveguides T01 and T02, the output monitoring channel waveguides (S01, S02), and others are similar to those of the optical multiplexing circuit 1 shown in FIG. 17.

The input terminals I1, I2, . . . , In for n electric signals to be transmitted and control signal extracting circuits C1, C2, . . . , Cn for controlling the wavelengths of the electrooptic conversion circuits L2, L2, . . . , Ln are similar to those in FIG. 7 for the first example, described previously.

Now, the functions of the wavelength control circuit 400 will be described by taking a line from the electric-signal input terminal II by way of example.

An electric signal input to the input terminal I1 is converted into an optical signal of the wavelength $\lambda_1$ by the electrooptic conversion circuit L1. This optical signal enters the arrayed-waveguide grating type optical multiplexing circuit 1 through the input transmission channel waveguide T1. In the optical multiplexing circuit 1, the optical signal is multiplexed with optical signals of other wavelengths, and the multiplexed signal is output to the output transmission channel waveguides T01 and T02.

FIG. 23A shows the optical transmission wavelength characteristics between the input transmission channel waveguide T1 and the output transmission channel waveguides T01 and T02.

In this case, if the optical signal is consistent with the wavelength $\lambda_1$, the output transmission channel waveguides T01 and T02 have an equal optical transmittance, and the signal is divided into two signals of the same magnitude, and then the divided signals are output to the channel waveguides T01 and T02, respectively.

However, as shown in FIG. 23A, if the wavelength is shifted to $\lambda_1'$, one T02 of the output transmission channel waveguides has a higher optical transmittance than the other T01, so that the output transmission channel waveguide T01 provides a reduced output, while the output transmission channel waveguide T02 provides an increased output.

This change in transmittance is equivalent to that shown in FIGS. 23B and 23C by arrows.

That is, FIG. 23B shows a change in optical transmittance between the output monitoring channel waveguide S01 and the input monitoring channel waveguide S11. In this case, the monitoring channel waveguide S01 reflects the output state of the output transmission channel waveguide T01.

FIG. 23C shows a change in optical transmittance between the output monitoring channel waveguide S02 and the input monitoring channel waveguide S12. In this case, the monitoring channel waveguide S02 reflects the output state of the output transmission channel waveguide T02.

Parts of signals from the output transmission channel waveguides T01 and T02 are input to the output monitoring channel waveguides S01 and S02, respectively, via the optical waveguides B1 and B2 connected to the optical branching circuits D1 and D2, respectively. These parts are demultiplexed in the multiplexing area 30, and the demultiplexed signals are output to the input monitoring channel waveguides S11 and S12.

The signals output to the input monitoring channel waveguides S11 and S12 have an equal magnitude each other when their wavelength is consistent with a predetermined value. On the other hand, one of the signals has a larger magnitude than the other when their wavelengths have a deviation.

A shift in output signals is input to the control signal extracting circuit C1 connected to the input monitoring channel waveguides S11 and S12. The control signal extracting circuit C1 outputs a control signal to the electrooptic conversion circuit L1 via the signal line 235, thereby controlling the wavelengths of the optical signals to a predetermined value.

On the other hand, the synthesis circuit D3, shown in FIG. 22, can be implemented by reversely using the input and output of the branching circuit shown in FIG. 8. That is, an optical signal transmitted from the optical waveguide T03 is input to the circuit C01, and an optical signal transmitted from the other optical waveguide T04 is input to the circuit C02, and then these two optical signals are synthesized in the optical waveguide T0. Thus, a wavelength multiplexed optical signal ($\lambda_1, \lambda_2, \ldots, \lambda_n$) is output from the optical waveguide T0 to the exterior.

Figure 24:
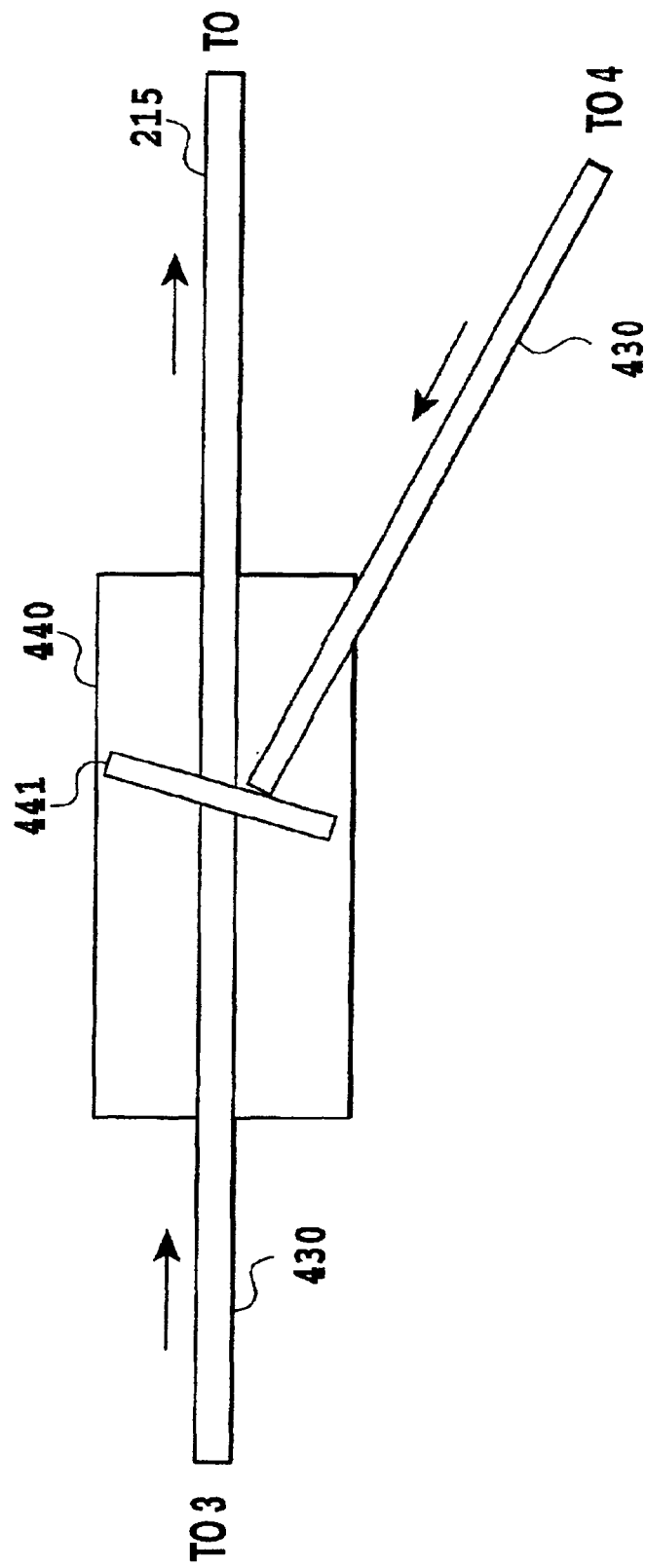
FIG. 24 is a block diagram showing a configuration of a synthesis circuit.

Alternatively, the multiplexing circuit shown in FIG. 24 can also be used as a synthesis circuit D3. Two optical signals are coupled together in the optical waveguide T0 by selecting the characteristics of a filter 411 so that one of the signals transmitted from the optical waveguide T03 passes through the filter 411, while the other signal transmitted from the optical waveguide T04 is reflected by the filter 411.

The line from the electric-signal input terminal I1 has been described, but this description can be applied to the other lines by replacing the wavelength $\lambda_1$ shown in FIGS. 23B and 23C with the wavelengths $\lambda_2, \ldots \lambda_n$.

(Integration)

In FIG. 22, the multiplexing area 30, the output transmission channel waveguides 50, the output monitoring channel waveguides 70, the optical branching circuit 410, the optical waveguides 420 each connecting between one of the optical branching circuit 410 and the monitoring channel waveguide 70, the optical coupling circuit 440, and the optical waveguides 430 each connecting between the optical branching circuit 410 and the optical coupling circuit 440 may be integrated together in the same body. This configuration produces effects similar to those of the first example.

The present invention has been described in conjunction with the principle thereof, the circuit configurations producing the effects thereof, and the operations thereof. However, all these examples provide very effective means for multiplexing a plurality of optical signals of different wavelengths, while detecting and controlling changes in wavelength.

As described above, according to the present invention, a part of a wavelength division multiplexed optical signal output from the multiplexing area is extracted to produce a check signal, and the extracted check signal is guided to the multiplexing area again. Then, the reentered check signal is detected at the facet located opposite the facet from which the check signal has been reentered, and the state of the detected check signal is determined. Furthermore, a control signal is output as required which controls the operations of a plurality of optical signals input to the multiplexing area, on the basis of the result of the determination. Consequently, the operational state of input optical signals can be checked by passing the part of the wavelength division multiplexed signal through the multiplexing area twice. There is no necessary for a separate complicated function of monitoring the wavelength of the optical signal, thereby precisely controlling an optical wavelength as well as structuring a simple circuit configuration.

Further, according to the present invention, either the multiplexing area and the extracting means, or, the multiplexing area, extracting means, and check signal reintroducing means are integrated together in the same body, thereby further downsizing an apparatus.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical multiplexing circuit to which a plurality of optical signals are input and which outputs a multiplexed beam subjected to wavelength division multiplexing, comprising:

a plurality of input transmission channel waveguides to each of which a corresponding one of a plurality of optical signals is input;

plural pairs of input monitoring channel waveguides into which a beam is introduced in a direction opposite to that for the input transmission channel waveguides and which output demultiplexed beams, each of the pairs including a first input monitoring channel waveguide and a second input monitoring channel waveguide;

an input slab waveguide having a first facet, wherein the first facet connected to said plurality of input transmission channel waveguides and said plural pairs of input monitoring channel waveguides;

at least one output transmission channel waveguide to which the multiplexed beam is guided, the multiplexed beam being obtained by multiplexing said plurality of optical signals transmitted from said plurality of input transmission channel waveguides;

at least one output monitoring channel waveguide into which a beam is introduced in a direction opposite to that for the output transmission channel waveguides and which transmits said demultiplexed beams to said plural pairs of input monitoring channel waveguides;

an output slab waveguide having a fourth facet, wherein the fourth facet connected to said at least one output transmission channel waveguide and said at least one output monitoring channel waveguides; and an arrayed waveguide comprising a plurality of optical waveguides having different optical path lengths, wherein the arrayed waveguide is connected to a second facet which is located opposite said first facet of said input slab waveguide, and is connected to a third facet which is located opposite said fourth facet of said output slab waveguide, wherein when said multiplexed beam is introduced into said fourth facet of said output slab waveguide through said output monitoring channel waveguide, the multiplexed light passes through the output slab waveguide and is demultiplexed by said input slab waveguide, and the demultiplexed beams are guided to the first facet and are output to said each pair of input monitoring channel waveguides having a corresponding wavelength.

2. The optical multiplexing circuit as claimed in claim 1, wherein at said first facet of said input slab waveguide, said plurality of input transmission channel waveguides are arranged at predetermined intervals, said each pair of input monitoring channel waveguides constituting said plural pairs of input monitoring channel waveguides is arranged so that center position of said each pair is spaced at predetermined interval, and the predetermined intervals at which the plurality of input transmission channel waveguides are arranged have a predetermined correlationship with the predetermined intervals at which the center positions of said plural pairs of input monitoring channel waveguides are arranged, and at said fourth facet of said output slab waveguide, said output transmission channel waveguide is located relative to said plurality of input transmission channel waveguides arranged at said first facet of said input slab waveguide, and said output transmission channel waveguide is located at such a position that the output transmission channel waveguide can multiplex said plurality of optical signals transmitted from the plurality of input transmission channel waveguides to generate said multiplexed beam, and said output monitoring channel waveguide is located relative to said each pair of input monitoring channel waveguides arranged at said first facet of said input slab waveguide, and said output monitoring channel waveguide is located at such a position that said demultiplexed beams guided to said each pair of input monitoring channel waveguides can be produced.

3. An optical multiplexer to which a plurality of optical signals are input and which outputs a multiplexed beam subjected to wavelength division multiplexing, comprising:

the optical multiplexing circuit set forth in claim 2;

extracting means for extracting a part of the multiplexed beam output from said optical multiplexing circuit to obtain a check signal;

check signal reintroducing means for reintroducing said extracted check signal into said optical multiplexing circuit; and check signal detecting means for detecting said check signal reintroduced into said optical multiplexing circuit, at a facet located opposite a facet into which the signal has been reintroduced.

4. The optical multiplexer as claimed in claim 3, wherein said extracting means comprises a branching section that branches a part of said multiplexed beam output from an output facet of said optical multiplexing circuit to obtain said check signal, said check signal reintroducing means comprises a first check terminal section connected to said branching section and installed at the output facet of said optical multiplexing circuit, and said check signal detecting means comprises plural pairs of second check terminal sections installed at an input facet of said optical multiplexing circuit, and wherein said multiplexed beam output from the output facet of said optical multiplexing circuit is branched by said branching section to extract said check signal, and said extracted check signal is reintroduced into said optical multiplexing circuit through said first check terminal section and then is output from said each of plural pairs of second check terminal sections as a check signal.

5. The optical multiplexer as claimed in claim 3, wherein said extracting means comprises a branching section that branches a part of said multiplexed beam output from the output facet of said optical multiplexing circuit to extract said check signal, said check signal reintroducing means comprises a third check terminal section connected to said branching section and installed at the input facet of said optical multiplexing circuit, and said check signal detecting means comprises plural pairs of fourth check terminal sections installed at the output facet of said optical multiplexing circuit, and wherein said multiplexed beam output from the output facet of said optical multiplexing circuit is branched by said branching section to extract said check signal, and said extracted check signal is reintroduced into said optical multiplexing circuit through said third check terminal section and then is output from said each of plural pairs of fourth check terminal sections as a check signal.

6. The optical multiplexer as claimed in claim 3, wherein said extracting means comprises:

a pair of fifth check terminal sections installed at the output facet of said optical multiplexing circuit; and a pair of branching sections connected to said pair of fifth check terminal sections to branch a part of said multiplexed light output from each of the fifth check terminal sections to extract said check signals, said check signal reintroducing means comprises a pair of sixth check terminal sections connected to each of said branching sections and installed at the same facet as that for said fifth check terminal sections, and said check signal detecting means comprises plural pairs of seventh check terminal sections installed at the input facet of said optical multiplexing circuit, wherein said multiplexed beam output from each of said fifth check terminal sections at the output of said optical multiplexing circuit is branched by said each branching section and then is extracted as said check signal, and said each extracted check signal is reintroduced into said optical multiplexing circuit through said sixth check terminal sections and then is output from said each seventh check terminal section as a check signal.

7. An optical multiplexer to which a plurality of optical signals are input and which outputs a multiplexed beam subjected to wavelength division multiplexing, comprising:

the optical multiplexing circuit set forth in claim 1;

extracting means for extracting a part of the multiplexed beam output from said optical multiplexing circuit to obtain a check signal;

check signal reintroducing means for reintroducing said extracted check signal into said optical multiplexing circuit; and check signal detecting means for detecting said check signal reintroduced into said optical multiplexing circuit at a facet located opposite a facet into which the signal has been reintroduced.

8. The optical multiplexer as claimed in claim 7, wherein said extracting means comprises a branching section that branches a part of said multiplexed beam output from an output facet of said optical multiplexing circuit to obtain said check signal, said check signal reintroducing means comprises a first check terminal section connected to said branching section and installed at the output facet of said optical multiplexing circuit, and said check signal detecting means comprises plural pairs of second check terminal sections installed at an input facet of said optical multiplexing circuit, and wherein said multiplexed beam output from the output facet of said optical multiplexing circuit is branched by said branching section to extract said check signal, and said extracted check signal is reintroduced into said optical multiplexing circuit through said first check terminal section and then is output from said each of plural pairs of second check terminal sections as a check signal.

9. The optical multiplexer as claimed in claim 7, wherein said extracting means comprises a branching section that branches a part of said multiplexed beam output from the output facet of said optical multiplexing circuit to extract said check signal, said check signal reintroducing means comprises a third check terminal section connected to said branching section and installed at the input facet of said optical multiplexing circuit, and said check signal detecting means comprises plural pairs of fourth check terminal sections installed at the output facet of said optical multiplexing circuit, and wherein said multiplexed beam output from the output facet of said optical multiplexing circuit is branched by said branching section to extract said check signal, and said extracted check signal is reintroduced into said optical multiplexing circuit through said third check terminal section and then is output from said each of plural pairs of fourth check terminal sections as a check signal.

10. The optical multiplexer as claimed in claim 7, wherein said extracting means comprises:

a pair of fifth check terminal sections installed at the output facet of said optical multiplexing circuit; and a pair of branching sections connected to said pair of fifth check terminal sections to branch a part of said multiplexed light output from each of the fifth check terminal sections to extract said check signals, said check signal reintroducing means comprises a pair of sixth check terminal sections connected to each of said branching sections and installed at the same facet as that for said fifth check terminal sections, and said check signal detecting means comprises plural pairs of seventh check terminal sections installed at the input facet of said optical multiplexing circuit, wherein said multiplexed beam output from each of said fifth check terminal sections at the output of said optical multiplexing circuit is branched by said each branching section and then is extracted as said check signal, and said each extracted check signal is reintroduced into said optical multiplexing circuit through said sixth check terminal sections and then is output from said each seventh check terminal section as a check signal.

11. An optical multiplexing circuit to which a plurality of optical signals are input and which outputs a multiplexed beam subjected to wavelength division multiplexing, comprising:

a plurality of input transmission channel waveguides to each of which a corresponding one of a plurality of optical signals is input;

at least one input monitoring channel waveguide into which a beam is introduced in the same direction as that for the input transmission channel waveguides and to which a multiplexed beam is input;

an input slab waveguide having a first facet, wherein the first facet connected to said plurality of input transmission channel waveguides and said at least one input monitoring channel waveguide;

at least one output transmission channel waveguide to which the multiplexed beam is guided, the multiplexed beam being obtained by multiplexing said plurality of optical signals transmitted from said plurality of input transmission channel waveguides;

plural pairs of output monitoring channel waveguides into which a beam is introduced in the same direction as that for the output transmission channel waveguides and to which said demultiplexed beams transmitted from said input monitoring channel waveguide are input, each of the pairs comprising a first output monitoring channel waveguide and a second output monitoring channel waveguide;

an output slab waveguide having a fourth facet, wherein the fourth facet connected to said at least one output transmission channel waveguide and said plural pairs of output monitoring channel waveguides; and an arrayed waveguide comprising a plurality of optical waveguides having different optical path lengths, wherein the arrayed waveguide is connected to a second facet which is located opposite said first facet of said input slab waveguide, and is connected to a third facet which is located opposite said fourth facet of said output slab waveguide, wherein when said multiplexed beam is introduced into is said first facet of said input slab waveguide through said input monitoring channel waveguide, the multiplexed light passes through the input slab waveguide and is demultiplexed by said output slab waveguide, and the demultiplexed beams are guided to the fourth facet and are output to said each pair of output monitoring channel waveguides having corresponding wavelengths.

12. The optical multiplexing circuit as claimed in claim 11, herein at said first facet of said input slab waveguide, said plurality of input transmission channel waveguides are arranged at predetermined intervals, said input monitoring channel waveguide is located relative to said each pair of output monitoring channel waveguides arranged at said fourth facet of said output slab waveguide, and said input monitoring channel waveguide is located at such a position that said demultiplexed beams guided to said each pair of output monitoring channel waveguides can be produced, and at said fourth facet of said output slab waveguide, said each pair of output monitoring channel waveguides constituting said plural pairs of output monitoring channel waveguides is arranged so that center position of said each pair of output monitoring channel waveguides is spaced at predetermined interval, the predetermined intervals at which the plurality of input transmission channel waveguides are arranged have a predetermined correlationship with the predetermined intervals at which the center positions of said plural pairs of output monitoring channel waveguides are arranged, and said output transmission channel waveguide is located relative to said plurality of input transmission channel waveguides arranged at said first facet of said input slab waveguide, and said output transmission channel waveguide is located at such a position that the output transmission channel waveguide can multiplex said plurality of optical signals transmitted from the plurality of input transmission channel waveguides to produce said multiplexed beam.

13. An optical multiplexer to which a plurality of optical signals are input and which outputs a multiplexed beam subjected to wavelength division multiplexing, comprising:

the optical multiplexing circuit set forth in claim 12;

extracting means for extracting a part of the multiplexed beam output from said optical multiplexing circuit to obtain a check signal;

check signal reintroducing means for reintroducing said extracted check signal into said optical multiplexing circuit; and check signal detecting means for detecting said check signal reintroduced into said optical multiplexing circuit, at a facet located opposite a facet into which the signal has been reintroduced.

14. The optical multiplexer as claimed in claim 13, wherein said extracting means comprises a branching section that branches a part of said multiplexed beam output from an output facet of said optical multiplexing circuit to obtain said check signal, said check signal reintroducing means comprises a first check terminal section connected to said branching section and installed at the output facet of said optical multiplexing circuit, and said check signal detecting means comprises plural pairs of second check terminal sections installed at an input facet of said optical multiplexing circuit, and wherein said multiplexed beam output from the output facet of said optical multiplexing circuit is branched by said branching section to extract said check signal, and said extracted check signal is reintroduced into said optical multiplexing circuit through said first check terminal section and then is output from said each plural pairs of second check terminal sections as a check signal.

15. The optical multiplexer as claimed in claim 13, wherein said extracting means comprises a branching section that branches a part of said multiplexed beam output from the output facet of said optical multiplexing circuit to extract said check signal, said check signal reintroducing means comprises a third check terminal section connected to said branching section and installed at the input facet of said optical multiplexing circuit, and said check signal detecting means comprises plural pairs of fourth check terminal sections installed at the output facet of said optical multiplexing circuit, and wherein said multiplexed beam output from the output facet of said optical multiplexing circuit is branched by said branching section to extract said check signal, and said extracted check signal is reintroduced into said optical multiplexing circuit through said third check terminal section and then is output from said each of plural pairs of fourth check terminal sections as a check signal.

16. The optical multiplexer as claimed in claim 13, wherein said extracting means comprises:

a pair of fifth check terminal sections installed at the output facet of said optical multiplexing circuit; and a pair of branching sections connected to said pair of fifth check terminal sections to branch a part of said multiplexed light output from each of the fifth check terminal sections to extract said check signals, said check signal reintroducing means comprises a pair of sixth check terminal sections connected to each of said branching sections and installed at the same facet as that for said fifth check terminal sections, and said check signal detecting means comprises plural pairs of seventh check terminal sections installed at the input facet of said optical multiplexing circuit, wherein said multiplexed beam output from each of said fifth check terminal sections at the output of said optical multiplexing circuit is branched by said each branching section and then is extracted as said check signal, and said each extracted check signal is reintroduced into said optical multiplexing circuit through said sixth check terminal sections and then is output from said each seventh check terminal section as a check signal.

17. An optical multiplexer to which a plurality of optical signals are input and which outputs a multiplexed beam subjected to wavelength division multiplexing, comprising:

the optical multiplexing circuit set forth in claim 11;

extracting means for extracting a part of the multiplexed beam output from said optical multiplexing circuit to obtain a check signal;

check signal reintroducing means for reintroducing said extracted check signal into said optical multiplexing circuit; and check signal detecting means for detecting said check signal reintroduced into said optical multiplexing circuit, at a facet located opposite a facet into which the signal has been reintroduced.

18. The optical multiplexer as claimed in claim 17, wherein said extracting means comprises a branching section that branches a part of said multiplexed beam output from an output facet of said optical multiplexing circuit to obtain said check signal, said check signal reintroducing means comprises a first check terminal section connected to said branching section and installed at the output facet of said optical multiplexing circuit, and said check signal detecting means comprises plural pairs of second check terminal sections installed at an input facet of said optical multiplexing circuit, and wherein said multiplexed beam output from the output facet of said optical multiplexing circuit is branched by said branching section to extract said check signal, and said extracted check signal is reintroduced into said optical multiplexing circuit through said first check terminal section and then is output from said each of plural pairs of second check terminal sections as a check signal.

19. The optical multiplexer as claimed in claim 17,
wherein said extracting means comprises a branching section that branches a part of said multiplexed beam output from the output facet of said optical multiplexing circuit to extract said check signal, said check signal reintroducing means comprises a third check terminal section connected to said branching section and installed at the input facet of said optical multiplexing circuit, and said check signal detecting means comprises plural pairs of fourth check terminal sections installed at the output facet of said optical multiplexing circuit, and wherein said multiplexed beam output from the output facet of said optical multiplexing circuit is branched by said branching section to extract said check signal, and said extracted check signal is reintroduced into said optical multiplexing circuit through said third check terminal section and then is output from said each of plural pairs of fourth check terminal sections as a check signal.

20. The optical multiplexer as claimed in claim 17, wherein said extracting means comprises:

a pair of fifth check terminal sections installed at the output facet of said optical multiplexing circuit; and a pair of branching sections connected to said pair of fifth check terminal sections to branch a part of said multiplexed light output from each of the fifth check terminal sections to extract said check signals, said check signal reintroducing means comprises a pair of sixth check terminal sections connected to each of said branching sections and installed at the same facet as that for said fifth check terminal sections, and said check signal detecting means comprises plural pairs of seventh check terminal sections installed at the input facet of said optical multiplexing circuit, wherein said multiplexed beam output from each of said fifth check terminal sections at the output of said optical multiplexing circuit is branched by said each branching section and then is extracted as said check signal, and said each extracted check signal is reintroduced into said optical multiplexing circuit through said sixth check terminal sections and then is output from said each seventh check terminal section as a check signal.

21. An optical multiplexing circuit to which a plurality of optical signals are input and which outputs a multiplexed beam subjected to wavelength division multiplexing, comprising:

a plurality of input transmission channel waveguides to each of which a corresponding one of a plurality of optical signals is input;

plural pairs of input monitoring channel waveguides into which a beam is introduced in a direction opposite to that for the input transmission channel waveguides and which output demultiplexed beams, each of the pairs including a first input monitoring channel waveguide and a second input monitoring channel waveguide;

an input slab waveguide having a first facet, wherein the first facet connected to said plurality of input transmission channel waveguides and said plural pairs of input monitoring channel waveguides;

a pair of a first output transmission channel waveguide and a second output transmission channel waveguide to which the multiplexed beam is guided, the multiplexed beam being obtained by multiplexing said plurality of optical signals transmitted from said plurality of input transmission channel waveguides;

a pair of a first output monitoring channel waveguide and a second output monitoring channel waveguide into which a beam is introduced in a direction opposite to that for said pair of output transmission channel waveguides and which transmits said demultiplexed beams to said plural pairs of input monitoring channel waveguides;

an output slab waveguide having a fourth facet, wherein said fourth facet connected to said pair of the first and second output transmission channel waveguide and said pair of the first and second output monitoring channel waveguides; and an arrayed waveguide comprising a plurality of optical waveguides having different optical path lengths, wherein the arrayed waveguide is connected to a second facet which is located opposite said first facet of said input slab waveguide, and is connected to a third facet which is located opposite said fourth facet of said output slab waveguide, wherein when beams obtained by dividing said multiplexed beam are introduced into said fourth facet of said output slab waveguide through said pair of output monitoring channel waveguides, the beams passes through the output slab waveguide and is demultiplexed by said input slab waveguide, and the demultiplexed beams are guided to the first facet and are output to said each pair of input monitoring channel waveguides having a corresponding wavelength.

22. The optical multiplexing circuit as claimed in claim 21, wherein at said first facet of said input slab waveguide, said plurality of input transmission channel waveguides are arranged at predetermined intervals, said each pair of input monitoring channel waveguides constituting said plural pairs of input monitoring channel waveguides is arranged so that one of the channel waveguides of each pair as a reference position is arranged at predetermined intervals, and the predetermined intervals at which the plurality of input transmission channel waveguides are arranged have a predetermined correlationship with the predetermined intervals at which the one of said plural pairs of input monitoring channel waveguides is arranged by using one of the channel waveguides of one pair as a reference position, at said fourth facet of said output slab waveguide, said pair of output transmission channel waveguides are located relative to said plurality of input transmission channel waveguides arranged at said first facet of said input slab waveguide, and said pair of output transmission channel waveguides are located at such positions that the output transmission channel waveguides can multiplex said plurality of optical signals transmitted from the plurality of input transmission channel waveguides to produce said multiplexed beam, and said pair of output monitoring channel waveguides are located relative to said each pair of input monitoring channel waveguides arranged at said first facet of said input slab waveguide, and said each pair of output monitoring channel waveguides is located at such positions that said demultiplexed beams guided to said each pair of input monitoring channel waveguides can be produced.

23. An optical multiplexer to which a plurality of optical signals are input which outputs a multiplexed beam subjected to wavelength division multiplexing, comprising:

the optical multiplexing circuit set forth in claim 22;

extracting means for extracting a part of the multiplexed beam output from said optical multiplexing circuit to obtain a check signal;

check signal reintroducing means for reintroducing said extracted check signal into said optical multiplexing circuit; and check signal detecting means for detecting said check signal reintroduced into said optical multiplexing circuit, at a facet located opposite a facet into which the signal has been reintroduced.

24. The optical multiplexer as claimed in claim 23, wherein said extracting means comprises a branching section that branches apart of said multiplexed beam output from an output facet of said optical multiplexing circuit to obtain said check signal, said check signal reintroducing means comprises a first check terminal section connected to said branching section and installed at the output facet of said optical multiplexing circuit, and said check signal detecting means comprises plural pairs of second check terminal sections installed at an input facet of said optical multiplexing circuit, and wherein said multiplexed beam output from the output facet of said optical multiplexing circuit is branched by said branching section to extract said check signal, and said extracted check signal is reintroduced into said optical multiplexing circuit through said first check terminal section and then is output from said each of plural pairs of second check terminal sections as a check signal.

25. The optical multiplexer as claimed in claim 23, wherein said extracting means comprises a branching section that branches apart of said multiplexed beam output from the output facet of said optical multiplexing circuit to extract said check signal;

said check signal reintroducing means comprises a third check terminal section connected to said branching section and installed at the input facet of said optical multiplexing circuit;

said check signal detecting means comprises plural pairs of fourth check terminal sections installed at the output facet of said optical multiplexing circuit;

wherein said multiplexed beam output from the output facet of said optical multiplexing circuit is branched by said branching section to extract said check signal; and said extracted check signal is reintroduced into said optical multiplexing circuit through said third check terminal section and then is output from said each of plural pairs of fourth check terminal sections as a check signal.

26. The optical multiplexer as claimed in claim 23, wherein said extracting means comprises:

a pair of fifth check terminal sections installed at the output facet of said optical multiplexing circuit;

a pair of branching sections connected to said pair of fifth check terminal sections to branch apart of said multiplexed light output from each of the fifth check terminal sections to extract said check signals, said check signal reintroducing means comprises a pair of sixth check terminal sections connected to each of said branching sections and installed at the same facet as that for said fifth check terminal sections; and said check signal detecting means comprises plural pairs of seventh check terminal sections installed at the input facet of said optical multiplexing circuit;

wherein said multiplexed beam output from each of said fifth check terminal sections at the output of said optical multiplexing circuit is branched by said each branching section and then is extracted as said check signal; and said each extracted check signal is reintroduced into said optical multiplexing circuit through said sixth check terminal sections and then is output from said each seventh check terminal section as a check signal.

27. An optical multiplexer to which a plurality of optical signals are input and which outputs a multiplexed beam subjected to wavelength division multiplexing, comprising:

the optical multiplexing circuit set forth in claim 21;

extracting means for extracting a part of the multiplexed beam output from said optical multiplexing circuit to obtain a check signal;

check signal reintroducing means for reintroducing said extracted check signal into said optical multiplexing circuit; and check signal detecting means for detecting said check signal reintroduced into said optical multiplexing circuit, at a facet located opposite a facet into which the signal has been reintroduced.

28. The optical multiplexer as claimed in claim 27, wherein said extracting means comprises a branching section that branches a part of said multiplexed beam output from an output facet of said optical multiplexing circuit to obtain said check signal, said check signal reintroducing means comprises a first check terminal section connected to said branching section and installed at the output facet of said optical multiplexing circuit, and said check signal detecting means comprises plural pairs of second check terminal sections installed at an input facet of said optical multiplexing circuit, and wherein said multiplexed beam output from the output facet of said optical multiplexing circuit is branched by said branching section to extract said check signal, and said extracted check signal is reintroduced into said optical multiplexing circuit through said first check terminal section and then is output from said each of plural pairs of second check terminal sections as a check signal.

29. The optical multiplexer as claimed in claim 27, wherein said extracting means comprises a branching section that branches a part of said multiplexed beam output from the output facet of said optical multiplexing circuit to extract said check signal, said check signal reintroducing means comprises a third check terminal section connected to said branching section and installed at the input facet of said optical multiplexing circuit, and said check signal detecting means comprises plural pairs of fourth check terminal sections installed at the output facet of said optical multiplexing circuit, and wherein said multiplexed beam output from the output facet of said optical multiplexing circuit is branched by said branching section to extract said check signal, and said extracted check signal is reintroduced into said optical multiplexing circuit through said third check terminal section and then is output from said each of plural pairs of fourth check terminal sections as a check signal.

30. The optical multiplexer as claimed in claim 27, wherein said extracting means comprises:
- a pair of fifth check terminal sections installed at the output facet of said optical multiplexing circuit; and
- a pair of branching sections connected to said pair of fifth check terminal sections to branch a part of said multiplexed light output from each of the fifth check terminal sections to extract said check signals,
- said check signal reintroducing means comprises a pair of sixth check terminal sections connected to each of said branching sections and installed at the same facet as that for said fifth check terminal sections, and
- said check signal detecting means comprises plural pairs of seventh check terminal sections installed at the input facet of said optical multiplexing circuit,
- wherein said multiplexed beam output from each of said fifth check terminal sections at the output of said optical multiplexing circuit is branched by said each branching section and then is extracted as said check signal, and
- said each extracted check signal is reintroduced into said optical multiplexing circuit through said sixth check terminal sections and then is output from said each seventh check terminal section as a check signal.

* * * * *